United States Patent
Wang et al.

(10) Patent No.: US 10,198,654 B2
(45) Date of Patent: Feb. 5, 2019

(54) AUTOMATED SALIENCY MAP ESTIMATION

(71) Applicant: eBay Inc., San Jose, CA (US)

(72) Inventors: Qiaosong Wang, San Francisco, CA (US); Wen Zheng, San Jose, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 216 days.

(21) Appl. No.: 15/192,551

(22) Filed: Jun. 24, 2016

(65) Prior Publication Data
US 2017/0372162 A1 Dec. 28, 2017

(51) Int. Cl.
  *G06K 9/46* (2006.01)
  *G06K 9/00* (2006.01)
  *G06T 7/00* (2017.01)

(52) U.S. Cl.
  CPC ....... *G06K 9/4604* (2013.01); *G06K 9/00664* (2013.01); *G06T 7/0051* (2013.01)

(58) Field of Classification Search
  CPC . G06K 9/4604; G06K 9/00664; G06T 7/0051
  See application file for complete search history.

(56) References Cited

U.S. PATENT DOCUMENTS 5,488,674 A * 1/1996 Burt .......................... G06T 5/50
  345/639

8,401,292 B2 * 3/2013 Park ...................... G06K 9/4671
  382/173
2016/0163058 A1 * 6/2016 Wei ....................... G06K 9/3233
  382/171

OTHER PUBLICATIONS

Yang, Chuan, et al. "Saliency detection via graph-based manifold ranking." Proceedings of the IEEE conference on computer vision and pattern recognition. 2013.*
Tong, Na, et al. "Salient object detection via global and local cues." Pattern Recognition 48.10 (2015): 3258-3267.*

* cited by examiner

Primary Examiner — Bhavesh M Mehta
Assistant Examiner — Menatoallah Youssef
(74) Attorney, Agent, or Firm — Schwegman Lundberg & Woessner, P.A.

(57) ABSTRACT

In various example embodiments, a system and method are provided for automated estimation of a saliency map for an image based on a graph structure comprising nodes corresponding to respective superpixels on the image, the graph structure including boundary-connecting nodes that connects each non-boundary node to one or more boundary regions. Each non-boundary node is in some embodiments connected to all boundary nodes by respective boundary-connecting edges forming part of the graph. Edge weights are calculated to generate a weighted graph. Saliency map estimation comprises bringing respective nodes for similarity to a background query. The edge weights of at least some of the edges are in some embodiments calculated as a function of a geodesic distance or shortest path between the corresponding nodes.

20 Claims, 17 Drawing Sheets

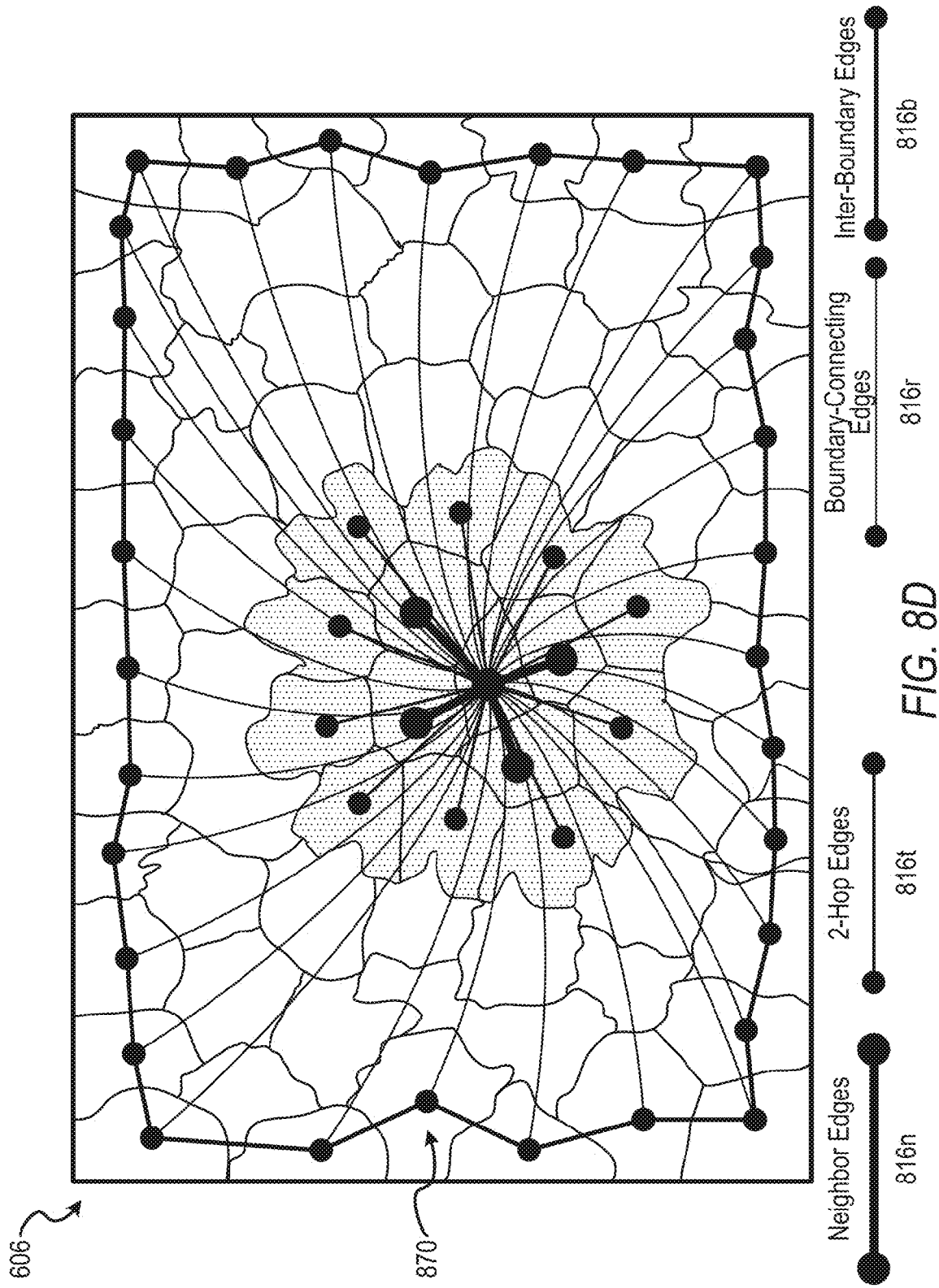

AUTOMATED SALIENCY MAP ESTIMATION

TECHNICAL FIELD

Embodiments of the present disclosure relate generally to computerized image processing.

BACKGROUND

Computerized image processing comprises the automated extraction of meaningful information from images, typically from digital images using digital image processing techniques. Some instances of such image processing involve automated identification of salient objects in photographs or pictures.

Saliency estimation is typically directed to identifying those parts of the scene in an image that are most important and/or informative. Such saliency detection or estimation can be applied to a number of vision problems, including but not limited to content-based image retrieval, image compression, image segmentation, and object recognition. For example, an online marketplace or an image-based search engine may process a large number of images of respective objects. Such images typically has a foreground object or salient feature that is the intended subject of the captured image. Automated recognition of the respective subjects of multiple digital images uploaded to such a marketplace can be complicated or frustrated by unreliable or inaccurate saliency detection. Saliency estimation can often be a significant preprocessing step for background removal or object/product detection and recognition in large ecommerce applications.

Many different methods for saliency map estimation have been proposed. Most existing approaches can be categorized into unsupervised approaches (typically bottom-up) and supervised approaches (typically top-down, but more recent approaches include a combination of top-down and bottom-up approaches). Unsupervised approaches identify salient features with reference only to the subject image, while supervised approaches employ material (such as a database of template images) external to the subject image.

While supervised approaches are able to integrate multiple features and in general achieve better performance than unsupervised methods, the necessary data collection and training process is expensive. Also, compared to traditional specialized object detectors (e.g., pedestrian detection), where objects in the same class have a relatively large degree of visual consistency, similar salient objects can have vastly different visual appearances in applications where the salient object can vary widely in type and nature—as is the case, for example, in product/item images in an online marketplace. Furthermore, the process of generating pixelwise ground truth annotations itself is expensive and labor intensive, and sometimes may even be impossible considering the scale of modern massive long-tailed visual repositories. This is typically the case in large e-commerce scenarios.

BRIEF DESCRIPTION OF THE DRAWINGS

Various ones of the appended drawings merely illustrate example embodiments of the present disclosure and cannot be considered as limiting its scope.

FIGS. 8A-8D is a series of schematic diagrams illustrating segmentation of an input image and construction of a graph for automated saliency estimation based on spectral graph analysis, according to one example embodiment.

Figure 1:
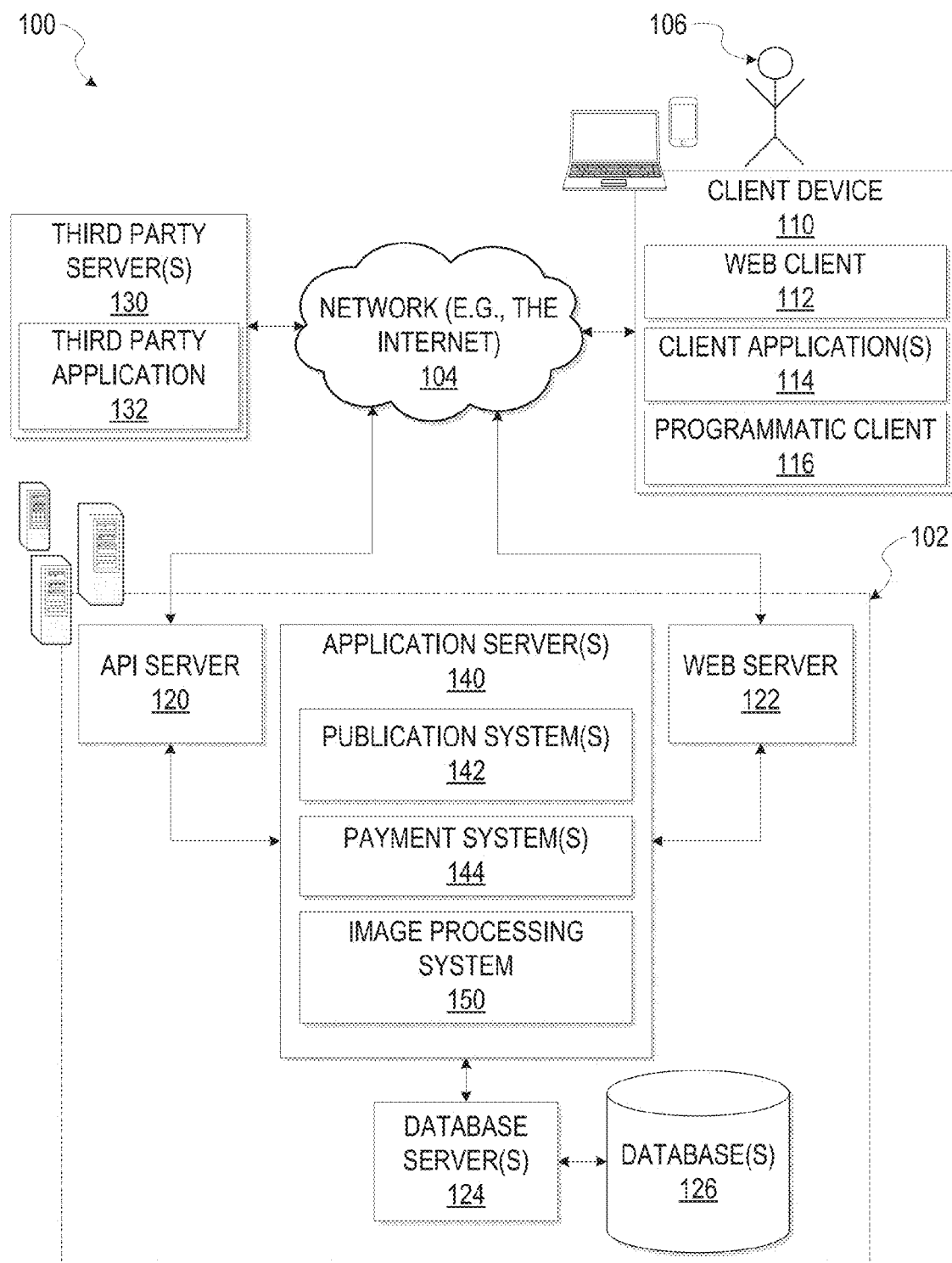
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A first aspect of the disclosure provides for a system configured for automated estimation a saliency map for an image based on a graph structure comprising nodes corresponding to respective superpixels on the image, the graph structure including boundary-connecting nodes that connects each non-boundary node one or more boundary regions. In one example embodiment, each non-boundary node is connected to all boundary nodes by respective boundary-connecting edges forming part of the graph. Another aspect of the disclosure provides for a method for automated saliency map estimation that includes constructing the above-described graph structure.

Construction of the saliency map is in some embodiments based on spectral graph analysis, to estimate similarity of respective superpixel nodes to one or more boundary regions. At least initially, similarity of a node to the selected boundary region(s) corresponds to estimation of that node as forming part of the image background. In some embodiments, a graph weighting procedure in which respective weighting values are calculated for the graph edges, a weighting value for each boundary-connecting nodes (that is, for each edge that forms part of the set of edges connecting a non-boundary node to all of boundary nodes) may be averaged by the number of boundary-nodes. In this manner, the edge weight contribution of all of the boundary-connecting edges correspond more or less to that of a single edge.

The system may be configured, and the computer-implemented method may comprise accessing image data indicating an image defined by multiple image pixels having respective visual characteristics, and segmenting the image into multiple superpixels, each of which corresponds to a respective group of contiguous image pixels. According to the first aspect of the disclosure, a graph is thereafter automatically constructed, the graph comprising: (a) a set of nodes corresponding to respective superpixels, a multiplicity of boundary nodes forming a subset of the set of nodes, each boundary node corresponding to a respective superpixel located at an image boundary; and (b) a set of edges, each edge directly connecting a corresponding pair of nodes, each non-boundary node in the set of nodes being connected to each boundary node in the boundary node subset by a respective edge forming part of the graph. The method further comprises constructing a saliency map for the image based at least in part on the graph, the saliency map indicating a shape and location of a foreground feature in the image. As will be seen, saliency map generation based on the graph in some embodiments comprise generating a weighted graph in which each edge of the graph has an associated weighting value, and using the weighted graph, ranking individual nodes based on their relevancy (as indicated by the associated edge weights) to a background query and/or a foreground query.

In some embodiments, the circuitry of at least one of the graph constructor, a preprocessor configured to segment the image, and the saliency map generator is provided by permanently configured circuitry (such as, for example, an application specific integrated circuit). In some embodiments, the circuitry of at least one of the graph constructor, the preprocessor, and the saliency map generator is provided by one or more dynamically reconfigurable computer processors temporarily configured to perform the respective operations. Such reconfigurable circuitry is in some embodiments provided by one or more software modules executed on the one or more computer processors.

Generating of the saliency map based on the graph may comprise ranking individual nodes based on their relevancy to a background query by use of spectral graph analysis. The background query is in some embodiments provided by separate queries for each of a plurality of boundary regions of the image. In some embodiments, in which the image has a quadrangular aspect with four rectilinear boundaries, three of the boundaries are automatically selected as query inputs based on exclusion of a visually most distinctive one of the boundary regions.

In some embodiments, the constructing of the graph comprises:
(1) connecting each non-boundary node with respective edges to both its immediate neighbor nodes and to its two-hop neighbor nodes;
(2) connecting each non-boundary node with respective edges to all of the boundary nodes (thus defining a subset of boundary-connecting nodes); and
(3) connecting each boundary node with respective edges to all of the other boundary nodes (thus defining a subset of inter-boundary edges).

The method may further comprise generating a weighted graph based on the graph and based on calculating a weighting value for each edge based at least in part on visual attributes of those superpixels corresponding to the associated pair of nodes connected by the edge, wherein the constructing of the saliency map is based at least in part on the weighted graph. The calculation of respective weighting value for each of the edges connecting non-boundary nodes to all of the boundary nodes (that is, for each node forming part of the subset of boundary often connecting nodes) may in some embodiments comprise calculating an initial weighting value for the edge, and dividing the initial weighting value by the number of boundary nodes forming part of the graph. Such averaging of the weights of the boundary connecting edges, when considering a single particular node, reduces the influence of the plurality of boundary-connecting nodes of the particular node to be approximately equivalent to the influence of one of the other edges.

The calculating of the weighting values in some embodiments comprises, for each edge that connects a respective pair of neighbor nodes, calculating a distance value that quantifies a difference between visual attributes of the superpixels corresponding to the respective neighbor nodes. In some embodiments, the weighting value of each edge for neighbor nodes is a function of the respective distance value. In some such instances, the weighting value may be a function of the distance value only. In one example embodiment, the weighting value for an edge between neighbor nodes is given expressed as $\exp[-(\text{distance value})/\sigma^2]$, where $\sigma$ is a constant.

The calculating of the weighting values may in some embodiments comprise, for at least some of the edges, determining a shortest path that extends between the relevant pair of nodes and that comprises a sequence of one-hop edges connecting respective neighbor nodes, a path length being expressed based on a cumulative value for weighting values or distance values of the one-hop edges forming part of the relevant path. The shortest path corresponds to a geodesic distance in visual space between the relevant nodes. In some embodiments, the path length may be expressed as cumulative distance values for the one-hop edges of the shortest deals available online to path, or as a cumulative value of another metric based on respective distance values. In some embodiments, the generating of the weighted graph comprises:

for each edge connecting a pair of neighbor nodes, applying a respective weighting value based on the corresponding distance value; and for each edge connecting a pair of non-neighbor nodes, applying a respective weighting value based on the corresponding shortest path.

The calculating of the weighting value for each edge in some embodiments comprises: for each node, determining a respective feature descriptor based at least in part on a plurality of visual attributes of the corresponding superpixel; and for each edge, calculating the corresponding weighting value based at least in part on the respective feature descriptors of the pair of nodes connected by the end. The plurality of visual attributes upon which the feature descriptors in some embodiments comprises: one or more color metrics, and a texture metric. In some embodiments, the plurality of visual attributes is limited to the one or more color metrics and the texture metric. In some embodiments, the one or more color metrics includes: a mean color value for the image pixels of the corresponding superpixel; and a color space histogram for the corresponding superpixel. The texture metric may in some embodiments comprise a response from a texture classification filter bank The method may further comprise extracting the foreground feature by applying the saliency map to the image. In one example embodiment, the image processing and feature extraction may be performed as part of an image processing operation performed on listing images in an online marketplace system.

Note that disclosed improvements over existing saliency detection techniques include, at least, (a) inclusion of the set of boundary connecting nodes for each non-boundary node in the graph, (b) calculating edge weights based at least in part on a geodesic distance or shortest path constraint for at least some of the edges, and (c) provision of a superpixel feature descriptor based on one or more color metrics and a texture metric.

Some embodiments of the disclosure therefore provide for graph weighting based at least in part on a geodesic distance or shortest path constraint, without the graph structure necessarily including the set of boundary connecting nodes extending between each non-boundary node and all of the boundary nodes. Other embodiments may likewise provide for calculation of edge weights based on a superpixel feature descriptor that is a function of a texture metric and one or more color metrics, without the graph necessarily including a set of boundary connecting nodes for each non-boundary node, and without necessarily imply the geodesic distance or shortest path constraint in edge weighting.

A certain aspect of the disclosure thus provides for a method and a system for automated sentence map estimation that comprises constructing a weighted graph comprising nodes corresponding to image superpixels, and edges connecting respective pairs of nodes, each edge having a corresponding weighting value, wherein calculating of a weighting value for at least some of nodes is based at least in part on a geodesic distance or shortest path in a visual space between the nodes at the opposite ends of the edge. As described elsewhere, a geodesic distance constraint may in some embodiments apply to edges that connect non-laboring nodes.

Likewise, a further aspect of the disclosure provides for a method and system for automated saliency map estimation that comprises constructing a weighted graph comprising nodes corresponding to image superpixels, and edges connecting respective pairs of nodes, the method including calculating a weighting value for each age based at least in part on respective feature descriptors of the corresponding superpixels of the nodes connected by the edge, the feature descriptor being expressed as a function of one or more color metrics, and as a function of a texture metric.

A more detailed example embodiment of a system and method for estimating image saliency maps will now be described in the example context of image processing for item listing classification and image-based search in an online marketplace system. First, marketplace system architecture and example marketplace-related processes will be described with reference to FIGS. 1-5. Thereafter, a high-level overview of a saliency map estimation process according to one example embodiment will be described with reference to FIG. 6, after which the example saliency map estimation process will be described in greater detail with reference to FIGS. 7-12. It is to be appreciated that the disclosed saliency map estimation techniques can be employed in various environments in which automated identification of salient features or objects in images may be useful, and that the disclosed image processing techniques are not limited to application in an online marketplace. Instead, an online marketplace is described below as one example application of the disclosed techniques for automated saliency map estimation.

With reference to FIG. 1, an example embodiment of a high-level client-server-based network architecture 100 is shown. A networked system 102, in the example forms of a network-based marketplace system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

Device types by which the client device 110 is provided comprise, but are not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and image processing system(s) 150, each of which may comprise one or more modules or applications and each of which may be embodied as hardware, software, firmware, or any combination thereof. The image processing system 150 is in this example embodiment configured for cooperation with the publication systems 142, to perform one or more image processing functionalities in the provision of publication and/or search functionalities by the publication system 150. The image processing system 150 therefore in this example embodiment provides an image processing engine community coupled to the publication systems 142.

The application servers HO are, in turn, shown to be coupled to one or more database servers 124 that facilitate access to one or more information storage repositories or database(s) 126. In an example embodiment, the databases 126 are storage devices that store information to be posted (e.g., publications, listings, listing images, and/or reference images libraries) to the publication systems 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication and/or search functions and services to users 106 that access the networked system 102. The payment systems 144 may likewise provide a number of functions to perform or facilitate payments and transactions. The image processing system 150 provides various image processing functionalities, at least some of which include automated estimation of salient features in digital images. These functionalities include, but are not limited to, automated classification of image content based on identification of respective salient features and image-based search functionalities. While these functionalities are in this example embodiment provided with respect to the functions of an online marketplace provided by the marketplace system 102, the image processing system 150 or its analog may in other embodiments be employed in use is different from the processing of online marketplace images. For example, the image processing system 150 may in some embodiments be employed with a general search engine to allow for image-based queries, and/or to search for result images based on user-provided queries.

Further, while the client-server-based network architecture 100 shown in FIG. 1 employs a client-server architecture, the present disclosed subject matter is of course not limited to such an architecture, and could equally well find application in a distributed, or peer-to-peer, architecture system, for example. The various publication system 142, payment system 144, and image processing system 150 could also be implemented as standalone software programs, which do not necessarily have networking capabilities.

The web client 112 may access the marketplace system 102 via the web interface supported by the web server 122. Similarly, the programmatic client 116 accesses the various services and functions provided by the online marketplace system 102 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, payment, and/or image processing functions that are supported by the relevant applications of the networked system 102.

Figure 2:
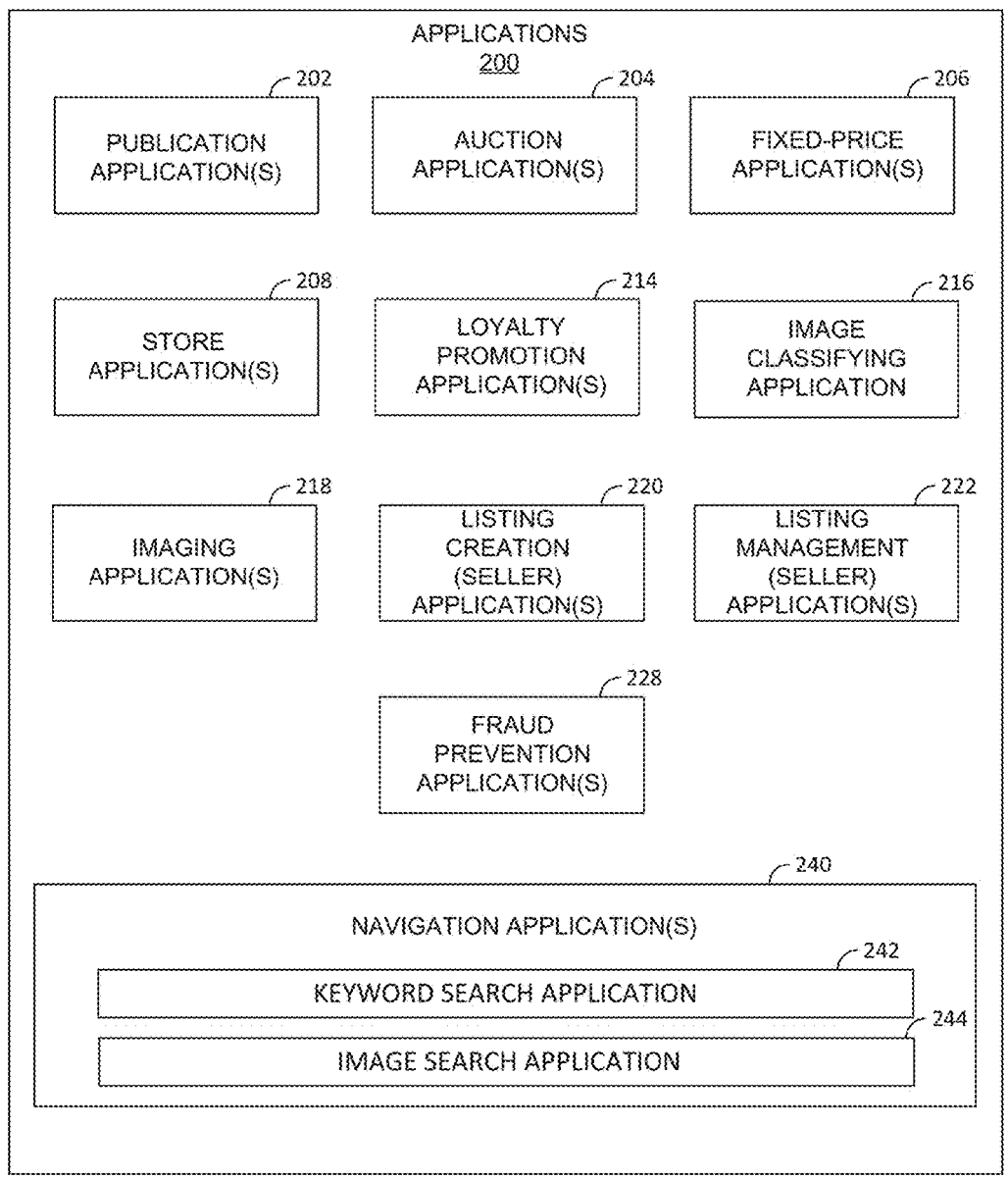
FIG. 2 is a schematic representation of various applications that form part of a marketplace system provided with functionality to process digital images based on saliency map estimation, according to some example embodiments.

FIG. 2 is a block diagram illustrating multiple marketplace and payment applications 200 that, in one example embodiment, are provided as part of the network-based marketplace system 150 and are configured to provide various functionalities of the publication systems 142, the payment systems 144, and the image processing system 150. The marketplace system 150 may in this example embodiment provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 200 are shown to include at least one publication application 202 and one or more auction applications 204 which support auction-format listing and price setting mechanisms (e.g., English, Dutch, Vickrey, Chinese, Double, Reverse auctions etc.). The various auction applications 204 may also provide a number of features in support of such auction-format listings, such as a reserve price feature whereby a seller may specify a reserve price in connection with a listing and a proxy bidding feature whereby a bidder may invoke automated proxy bidding.

A number of fixed-price applications 206 support fixed-price listing formats (e.g., the traditional classified advertisement-type listing or a catalogue listing) and buyout-type listings. Store applications 208 allow sellers to group their listings within a "virtual" store, which may be branded and otherwise personalized by and for the sellers. Such a virtual store may also offer promotions, incentives and features that are specific and personalized to a relevant seller.

Navigation of the network based-marketplace may be facilitated by one or more navigation applications 240. For example, a keyword search application 242 enables keyword searches of listings published via the marketplace system 150. Similarly, an image search application 244 enables an image-based search of item listings published via the marketplace system 150. To perform an image-based search, a user will typically submit a query image, whereupon the image search application 244 may compare the query image to images in the image database to produce a result list of item listings based on a similarity ranking between the query image and the images associated with the respective item listings. The comparison ranking is established by parsing or processing the query image to provide classification data, and thereafter comparing the query image's classification data to pre-compiled classification data for the listing images. As will be described in more detail below, such processing of the images in this example embodiment includes identification of salient features of the respective images through estimation of respective saliency maps. Various other navigation applications may be provided to supplement the search and browsing applications.

In order to make listings available via the network-based marketplace visually informative and attractive, as well as to enable image-based searching, the marketplace applications 200 may include one or more imaging applications 218, which users may use to upload images for inclusion within listings. Images thus uploaded are stored in an image database, each image being associatively linked to at least one item listing in an item listing database. One of the imaging applications 218 also operates to incorporate images within viewed listings. The imaging applications 218 may also support one or more promotional features, such as image galleries that are presented to potential buyers. For example, sellers may pay an additional fee to have an image included within a gallery of images for promoted items.

The marketplace system 150 may also include an image classifying application 216 to parse or process images uploaded via the imaging applications 218, as well as to parse or process query images submitted via the image search application 244. The result of processing images by the image classifying application 216 is classification data or classification data which is stored as metadata linked to the corresponding images. Particular processes for extracting or estimating salient features of such images as part of an automated image classifications, are discussed in more detail below.

Listing creation applications 220 allow sellers conveniently to author listings pertaining to goods or services that they wish to transact via the marketplace system 150, and listing management applications 222 allow sellers to manage such listings. Specifically, where a particular seller has authored and/or published a large number of listings, the management of such listings may present a challenge. The listing management applications 222 provide a number of features (e.g., auto-relisting, inventory level monitors, etc.) to assist the seller in managing such listings.

A number of fraud prevention applications 228 implement various fraud detection and prevention mechanisms to reduce the occurrence of fraud within the marketplace. One of the fraud prevention applications 228 may include automatic image comparison, by use of image classification metadata produced by the image classifying application 216. Such image comparison may be used by the fraud prevention applications 228 automatically to detect listing images similar to the query image, and to alert a fraud assessor to such image listings, so that the human assessor can examine the identified item listing for assessing whether or not the identified item listing is a fraudulent listing.

Figure 3:
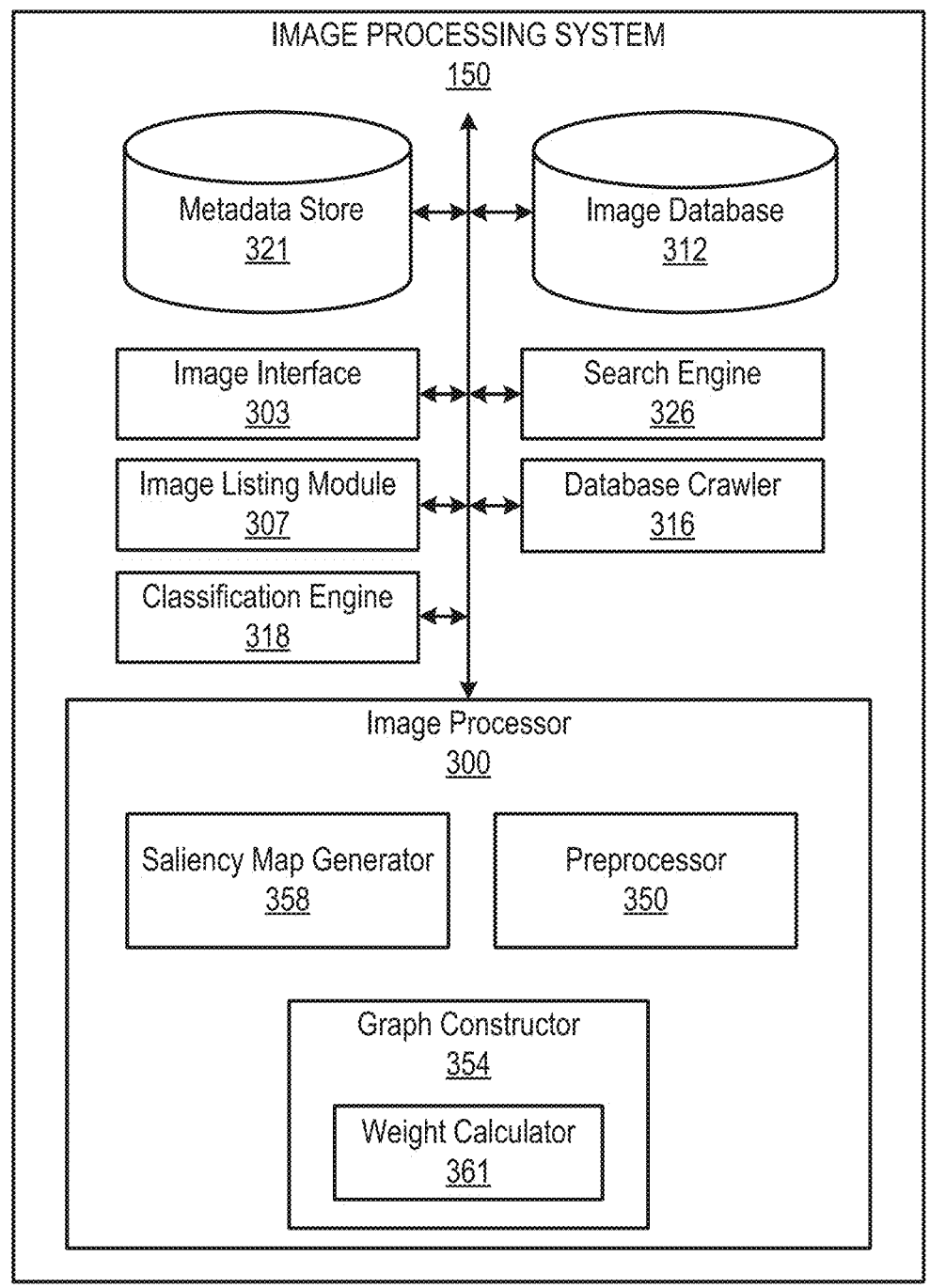
FIG. 3 is a diagrammatic representation of functional models and databases forming part of a marketplace system having saliency map-based image processing functionality, according to an example embodiment.

FIG. 3 is a high-level diagram illustrating a number of functional modules or components forming part of the example image processing system 150. Note that the respective modules or machine components illustrated and described with reference to FIG. 3 are hardware-implemented components comprising circuitry configured to perform specific respective functions. Again, the specially configured circuitry of the respective modules or functional components is in some embodiments provided by the execution of software on one or more dynamically reconfigurable processors, so that each module or functional component is formed by the processor(s) during execution of a corresponding software routine or application. In other embodiments, the circuitry of at least some of the described modules or components forming part of the system 150 is provided by respective permanently configured circuits, such as application-specific integrated circuits. Furthermore, note that although the image processing system 150 is in this example embodiment shown as forming part of the online marketplace system 102 and is thus provided as a server-side system, it should be noted that the image processing system 150 or at least parts thereof may in other embodiments be provided on a client-side device, for example being hardware-implemented on a personal desktop computer or a mobile electronic device. For example, an image processor 300 may in some embodiments be implemented on a client-side device. The image processor 300 may likewise form part of other example systems in which salient feature identification is used for purposes other than in the current example context of an online marketplace or image search functionality. In yet further embodiments, the respective components of the example image processing system 150 may be provided collectively by a number of physically dispersed devices.

The system 150 includes an image interface 303 for receiving or retrieving one or more images that are to be processed. In this example embodiment, the image interface 303 is configured for receiving a listing query which includes a query image, to access one or more listing images, and to retrieve listing images from an image database 312 forming part of the system databases 126. Digital images that may thus be received or accessed by the image interface 303 are typically electronic image files in a standard format, such as JPEG, GIF, TIFF, etc.

An image listing module 307 is operatively connected to the image processor 300 to communicate to the image processor 300 images forming part of newly created item listings. The system further includes a database crawler 316 which serves to interrogate the image database 312 in order to identify images in the image database 312 which have not yet been processed by the image processor 300, and for which there is thus no associated classification data in a metadata store 321 forming part of the system database 226.

It will be appreciated that automated extraction of foreground features can in this example embodiment be performed as part of automated classification of image content based on the identified foreground features, and may in some instances be implemented in a network-based marketplace having large numbers of existing listing images for which there are, of course, no classification data. To permit image-based searching of the image database 312 through the use of classification data, the database crawler may continually locate and submit unclassified legacy images in the image database 312 and pass them to the image processor 300 for imaging. It should be noted accordingly that although image database 312 is illustrated in the figures by a single element, the image database 312 may be provided by any number of databases distributed through a network.

The image processor 300 is configured to parse or process images submitted to it to automatically identify and extract foreground features from the images. In this example embodiment, the image processor 300 is in communication with a classification engine 318 configured for automated object recognition and classification based on image foreground information generated by the image processor 300. The image processor 300 is likewise in communication with a search engine 326 to receive a query image and to extract the foreground information from the query image for facilitating an image-based search with respect to the query image.

The image processor 300 is configured to automatically generate a saliency map indicating estimated shape, size, and position of image foreground features, and to extract or isolate the foreground features based on the saliency map thus generated. The example image processor 300 is in this example embodiment configured for automated generation of the saliency map based on procedures schematically illustrated in and described with reference to FIGS. 6 and 7.

The image processor 300 includes a preprocessor 350 configured to perform initial image classification and to segment the image into multiple superpixels, as illustrated in and described with reference to FIG. 8A. The image processor 300 further includes a graph constructor 354 for automated construction of a graph based on the segmented input image, with respective graph nodes corresponding to superpixels of the segmented image. Graph nodes are connected by edges of the graph.

Automated graph construction by the graph constructor 354 is in this example embodiment described at greater length below with reference to FIGS. 8A-8D and FIG. 9.

The graph constructor 354 further comprises a weight calculator 361 configured to automatically calculate respective weights for the graph edges, and to apply a resultant weight matrix to the previously constructed unweighted graph, to produce a weighted graph. Automated procedures performed by the weight calculator 361 are further described below with reference to FIGS. 10 and 11.

The image processor 300 further includes saliency map generator 358 configured to generate a saliency map based on the previously generated weighted graph. In this example embodiment, as described at greater length with reference to FIG. 12, the saliency map generator 358 is configured to generate the saliency map based on graph analysis in a procedure that applies a ranking function to the weighted graph, to rank graph nodes according to similarity to a query. In this example embodiment, an initial query is provided by three of four image background regions. The saliency map generator 358 is further configured, in this example embodiment, to refine an initial result based on a foreground query from a preliminary foreground region identified in the initial result.

Classification information generated by the classification engine 318 is stored in the metadata store 321 in association with the respective images for use in subsequent image or image listing search or retrieval operations. The data format in the metadata store 321 may be in a spatial data structure, such as a two-dimensional k-d tree, to facilitate searching of the system database(s) 226. Further, the images stored in the image database 312 are linked to associated item listings elsewhere in the system database(s) 226.

The search engine 326 is in communication with both the image processor 300 and the metadata store 321, to compare classification data for a query image with the classification data in the metadata store 321 for finding database images similar to the query image. Instead, or in addition, the search engine 326 can be configured to perform a search based on comparison of the extracted foreground features of the query image to foreground features of previously processed images. The search engine 326 in this example embodiment produces a ranking of database images according to similarity to the query image. The search engine 326 is further configured for delivering to a user the results of a search query which includes a query image. The search results may be delivered by the user in a format of the user's choosing, such as, for instance, via e-mail or in http format on a web browser application.

Figure 4:
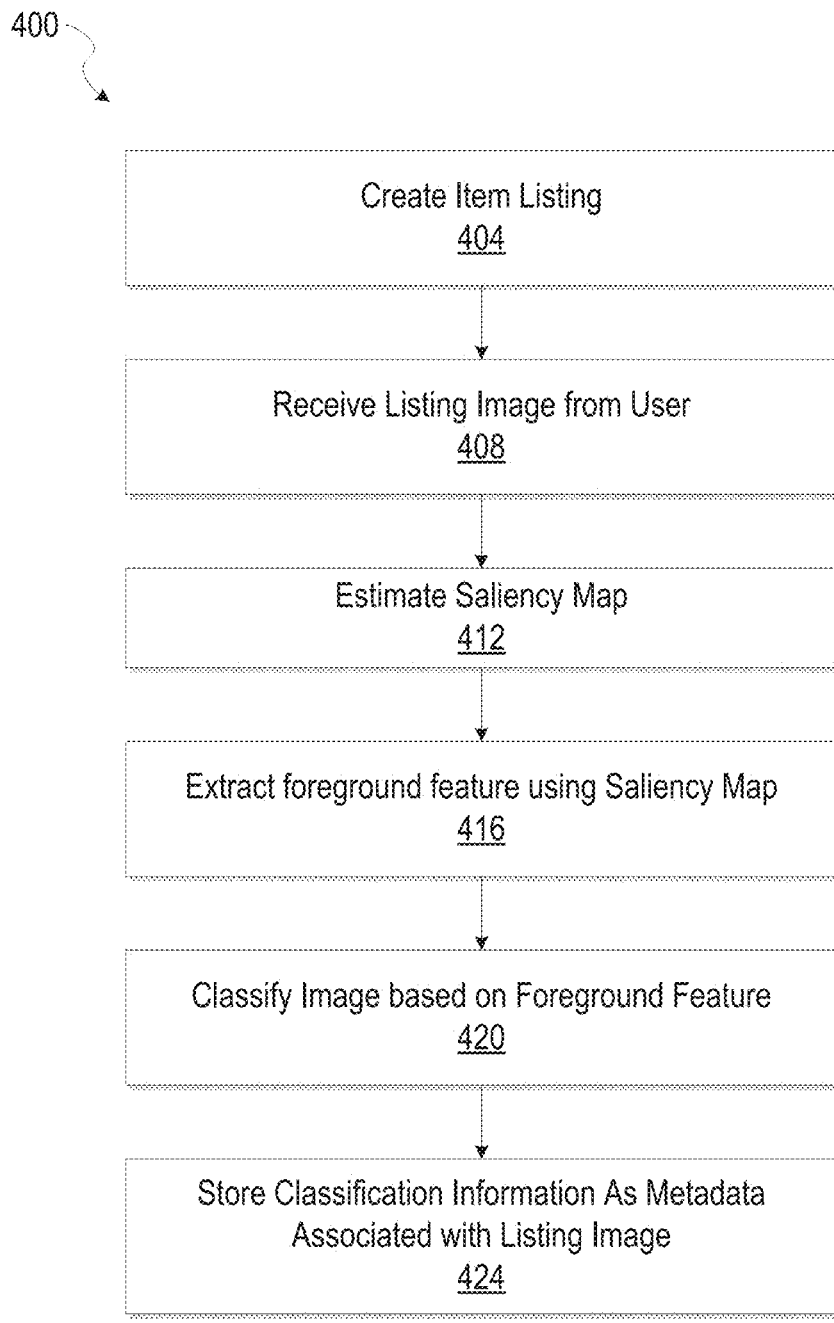
FIG. 4 is a flowchart illustrating a method of processing a listing image, according to an example embodiment.

FIG. 4 is a flowchart showing a method 400 for processing an image in a network-based marketplace in accordance with an example embodiment. The operations of the method 400 is in this example embodiment performed using the various system components described with reference to FIGS. 1-3.

The method 400 starts with the creation of an item listing, at operation 404, by a user. Creation of the item listing may include submission of an image related to the listing, typically being an image of the item which is offered for sale or auction on the marketplace. The submitted image is received by the system 150, at operation 408.

The image may be an electronic image in standard file format, such as PEG, which comprises a raster of pixels. Each pixel may have hue, saturation, and intensity values, in conventional fashion. It will be appreciated that images which were submitted earlier, but which have not been indexed, may be provided to the image processor 300 by the database crawler 316 of FIG. 3, so that operation 408 in FIG. 4 may instead comprise submitting an un-classified image from an image database for processing.

At operation 412, the image processor 300 estimates a saliency map for the listing image, in this example embodiment by use of the procedures for generating a saliency map described with reference to FIG. 6-12. At operation 416, a foreground feature indicated by the saliency map is extracted by applying the saliency map to the listing image.

At operation 420, the listing image is classified or indexed based on automated investigation of the extracted foreground feature. This may comprise automated identification or recognition of the particular object or item represented by the foreground feature. Thus, the particular item type, brand, color, model, etc. may be automatically identified and included in classification information for the image. Classification information thus generated by the classification procedure is stored as image-linked metadata, at operation 424, in the metadata store 321.

Figure 5:
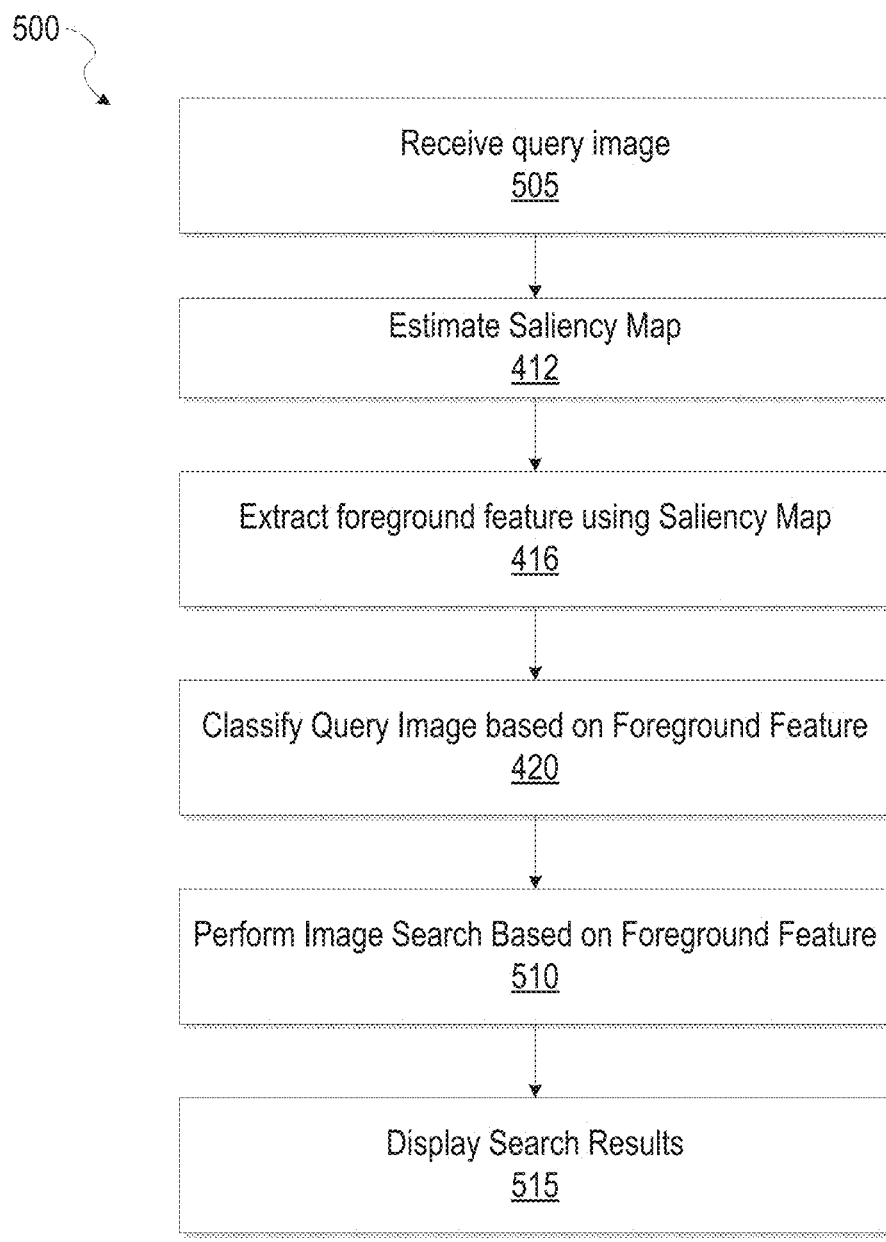
FIG. 5 is a flowchart illustrating a method of performing an image-based search, in accordance with an example embodiment.

FIG. 5 shows an example method 500 for performing an image-based search based at least in part on automated saliency map estimation, as disclosed herein. At operation 505, a query image is received from a user. The query image is then processed in operations 412 through 420 in a manner similar to that described above with reference to FIG. 4. In this example embodiment, extracted foreground features are thus are thus classified, at operation 420, to generate classification information estimating the nature of the foreground feature.

At operation 510, an image search through previously classified database images is performed based on the classification information of the foreground feature, and search results produced by the image search are displayed to the user, at operation 515. In other embodiments, the image search based on the extracted foreground feature, but operation 510, may be performed without the generation of or reference to classification information or image metadata.

Example Saliency Map Estimation

Example saliency map estimation according to one embodiment of the disclosed techniques will now be described. First, a broad overview of the saliency map procedures will be described with reference to FIG. 6, after which follows more detailed description of the respective operations forming part of such saliency map estimation.

As background to the description that follows, note that the disclosed saliency map estimation techniques are related to and in some embodiments incorporate at least some features of existing image processing methods that include: graph-based manifold ranking (as, for example, in Yan et al. *Hierarchical Saliency Detection* in *CVPR*, June 2013), geodesic distance (as, for example, in Wei, et al., *Geodesic Saliency Using Background Priors*, in *ECCV*, pages 29-42. Springer, 2012), boundary prior sampling (as, for example, in Li, et al., *Robust Saliency Detection Via Regularized Random Walks Ranking*, in CVPR. IEEE, 2015), and multiscale fusion (as, for example, in Yan, et al., *Hierarchical Saliency Detection in CVPR*, June 2013).

Graph-based approaches to saliency detection are popular due to the relative simplicity and efficiency of graph algorithms. Harel et al. (*NIPS*, pages 545-552, 2006) proposed graph based visual saliency (GBVS), a graph-based saliency model with multiple features to extract saliency information. Chang et al. (*ICCV*, pages 914-921. IEEE, 2011) present a computational framework by constructing a graphical model to fuse objectness and regional saliency. Yang et al. (*CVPR*, pages 3166-3173. IEEE, 2013) rank the similarity of superpixels with foreground or background seeds via graph-based manifold ranking. This method was further improved by the before-mentioned proposal by Li et al. to generate pixelwise saliency maps via regularized random walks ranking.

Recently, bottom-up methods have tended to prefer using the image boundary as the background seeds. This boundary prior is more general than previously used center prior, which assumes that the saliency object tends to appear near the image center. Wei et al. (see above) define the saliency of a region to be the length of its shortest path to the virtual background node. Zhu, et al., (*Saliency Optimization from Robust Background Detection*, In *CVPR*, pages 2814-2821. IEEE, 2014) proposed a robust background measure is proposed to characterize the spatial layout of an image region with respect to the boundary regions.

Figure 6:
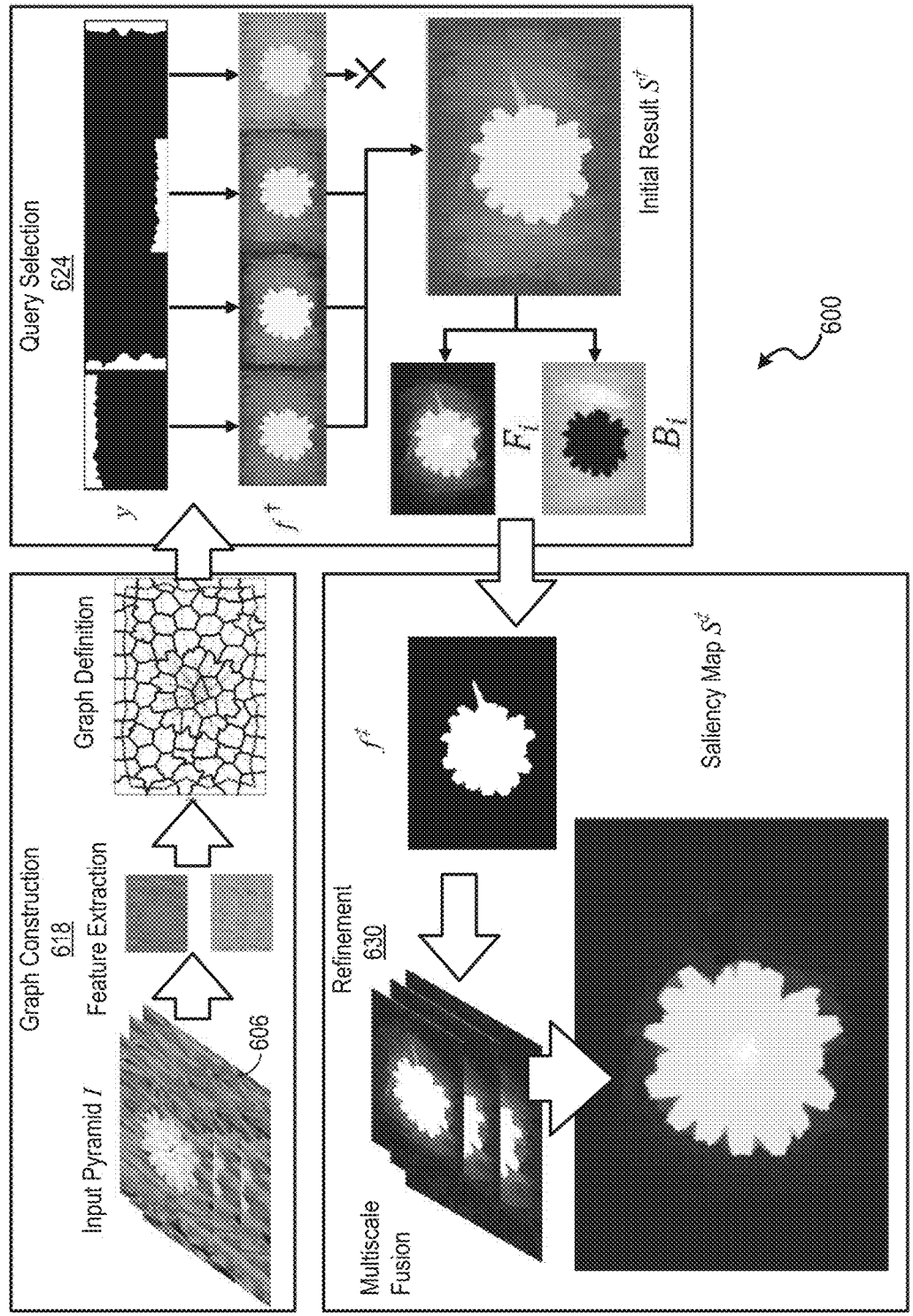
FIG. 6 is a schematic high-level workflow diagram illustrating a procedural workflow for estimating an image saliency map, according to an example embodiment.

Turning now to FIG. 6, therein is shown in broad schematic overview, a workflow 600 for automated estimation of a saliency map for a particular example image, according to the disclosed techniques. Here, the image 606 to be processed is of a flower located more or less centrally in the image and set against a verdant background. As discussed previously, human perception immediately distinguishes the flower as being the foreground feature, but distinguishing foreground features from the background is significantly more complex in automated machine-implemented processing. The procedure schematically illustrated in the workflow 600 of FIG. 6 is to generate a saliency map $S^{\ddagger}$ indicating an estimated shape, size, and location of the foreground feature of the relevant image 606. A person skilled in the art of image processing will appreciated that the example saliency map $S^{\ddagger}$ comprises a colorless mask that can be applied to the original image 606 to extract the identified foreground feature. In conventional fashion, pixel luminosity value in the saliency map $S^{\ddagger}$ corresponds to mask transparency. In other words, white areas of the saliency map $S^{\ddagger}$ indicates those parts of the image 606 identified as corresponding to the foreground feature.

The disclosed techniques provide for an unsupervised bottom-up saliency estimation approach based on spectral graph theory, using elements of spectral clustering algorithms. As can be seen in the overview flowchart of FIG. 6, the method comprises graph construction (operation 618), query selection (operation 624), and refinement (operation 630). Nodes in the graph are provided by respective megapixels of the image 606. Graph construction includes determining a weighting matrix for the graph based on color and texture features of the megapixel nodes.

During query selection (at 624), a boundary prior is exploited for selecting seeds to perform an initial background query. Groups of background seeds (y) are selected for initial saliency ($f^{\dagger}$) based on their influence via the graph structure. An inconsistent group of background seeds are eliminated. The resulting initial result ($s^{\dagger}$) is used to generate seeds to perform another query to obtain respective a final result ($f^{\ddagger}$).

This process is repeated at multiple scales indicated schematically by a multiscale input pyramid (I) during graph construction 618 and at multiscale fusion during refinement 630). The results ($f^{s}$) of saliency map estimation for the different scales are fused to produce a final saliency map ($S^{\ddagger}$).

Figure 7:
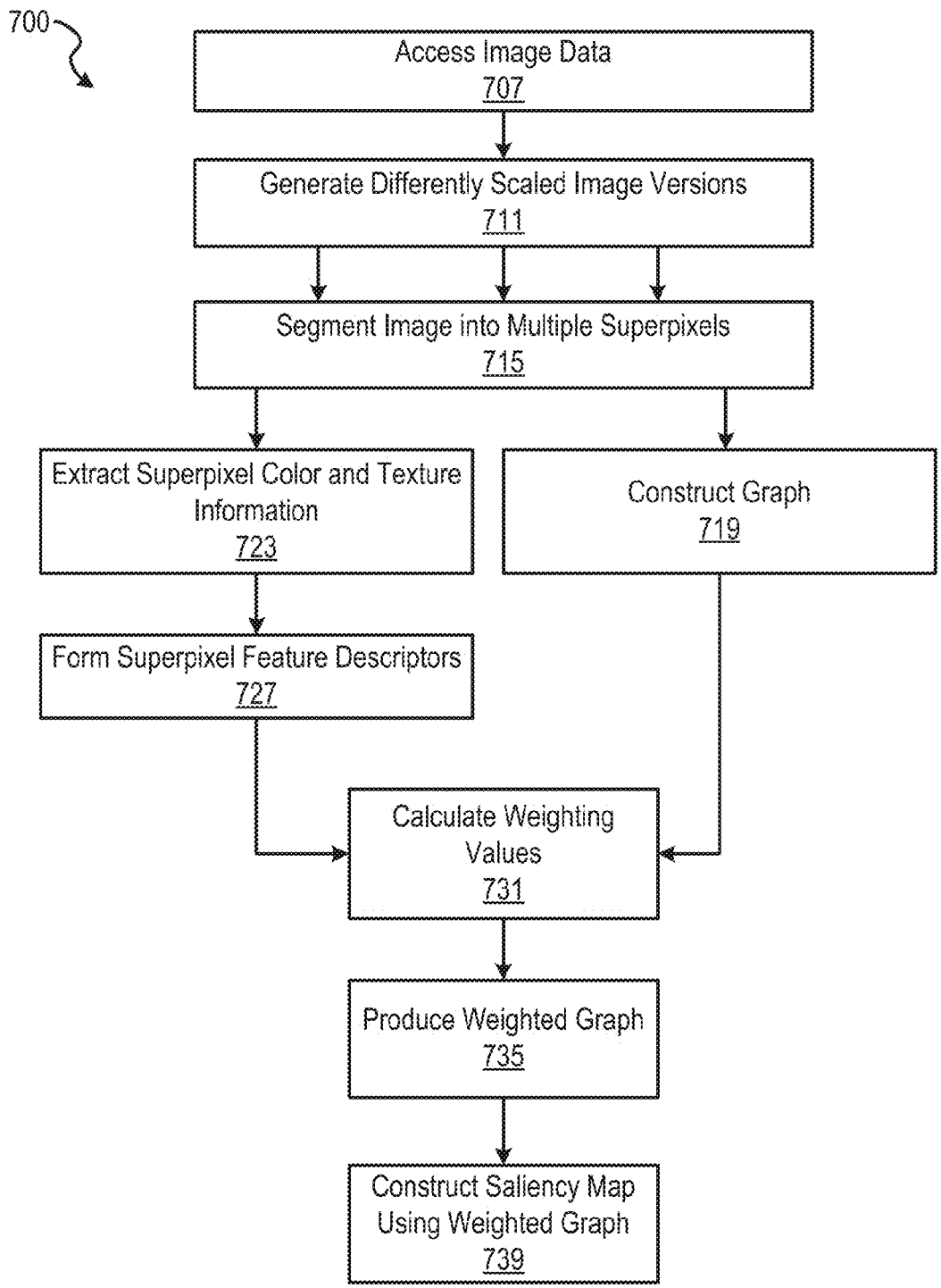
FIG. 7 is a flowchart illustrating a method for automated estimation of an image saliency map, according to an example embodiment.

Turning now to FIG. 7, therein is shown a more detailed schematic flow chart illustrating a method 700 for saliency map estimation corresponding to the workflow 600 of FIG. 6, according to one example embodiment. Description of graph construction in the method 700 will be with intermittent reference to parts of an example graph structure 800 for the example image 606, as illustrated schematically in FIGS. 8A-8D.

Figure 8A:
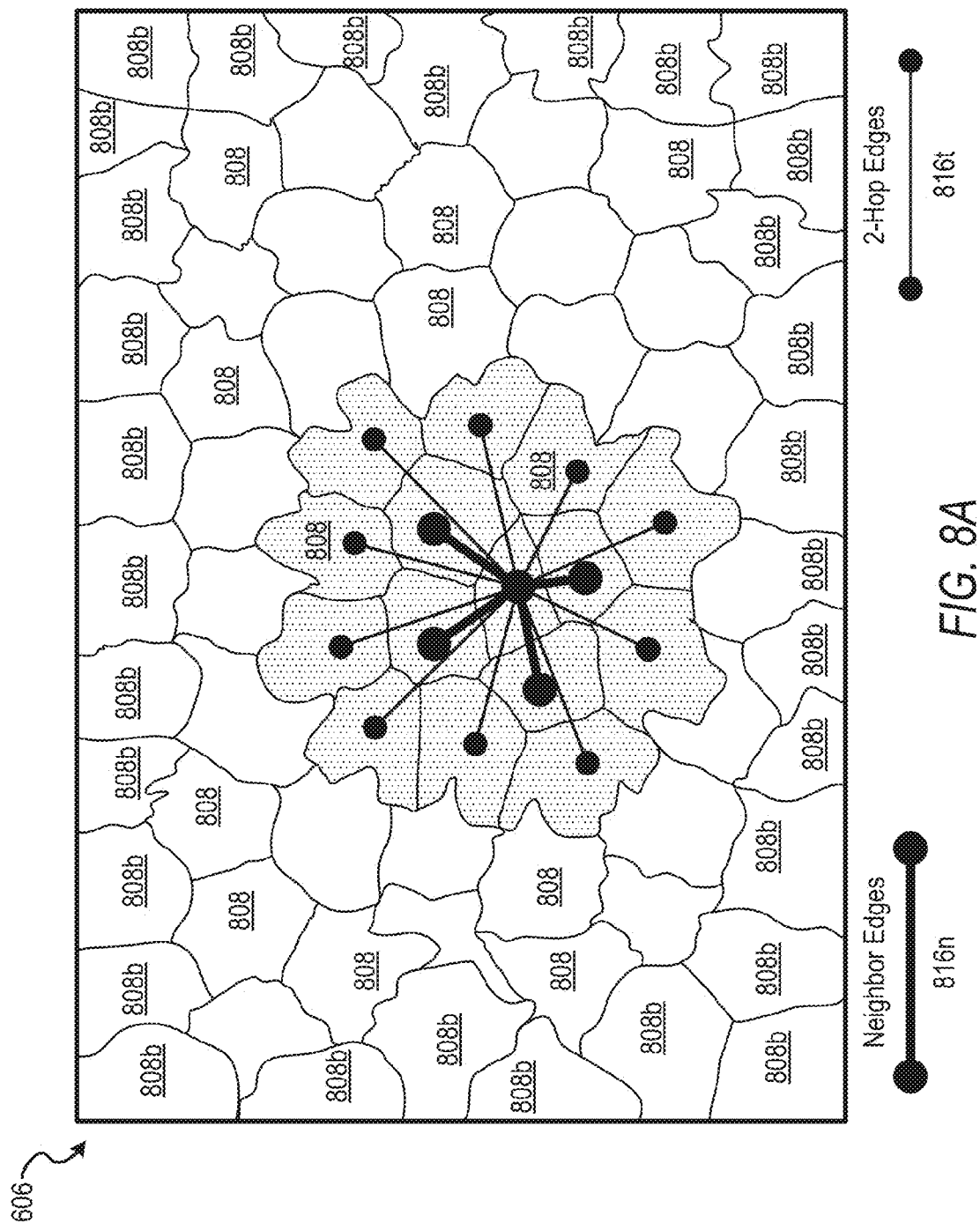

The example method 700 is based on building an undirected weighted graph for image superpixels 808 (FIG. 8A). The graph construction method 700 commences in this example embodiment by (at operation 707, FIG. 7) accessing image data representing the subject image 606. The image 606 is a digital image defined by multiple image pixels having respective visual characteristics, in this example embodiment having respective RGB values ranging between zero and 256.

Multiple differently scaled versions of the image 606 is thereafter generated, at operation 711, to provide an input pyramid comprising versions of the image 606 at different scales. In this example embodiment, the input pyramid comprises three image scales. Note that the operations that follow, up to a multiscale fusion operation to produce the final saliency map $S^{\ddagger}$, are performed separately for each separate scale of the image 606. For ease of description, however, each of these operations are described with respect to a single image scale.

Thereafter, the image 606 (also indicated I) is segmented, at operation 715, into multiple (n) superpixels 808 (FIG. 8A) $S=\{s_1, s_2, \ldots, s_n\}$ via the Simple Linear Iterative Clustering (SLIC) algorithm (see Achanta, et al., *SLIC superpixels compared to state-of-the-art superpixel methods*. PAMI, 34(11):2274-2282, 2012). It will be appreciated that, in other embodiments, different segmentation mechanisms may be employed. Each superpixel 808 is made up of a corresponding group of contiguous image pixels. In this example embodiment, the image 606 is segmented into 200 superpixels 808, regardless of the size of the image. Therefore, in this embodiment, each of the differently scaled versions of the input image 606 has 200 superpixels 808.

At operation 719, a graph is constructed, G=(V, E) where V is a set of nodes corresponding to superpixels 808 (S), and E is a set of edges 816 (see FIG. 8A-8D) extending between nodes. In other words, a graph is constructed based on the segmented image 606, with the graph comprising a set of nodes corresponding to the superpixels 808, and a set of edges 816, each of which directly connects a corresponding pair of nodes. The disclosed graph model according to which the graph is constructed is discussed below with reference to FIGS. 8A-8D and 9

For each superpixel 808, color and texture information is determined, at operation 723, and a regional feature descriptor r is formed, at operation 727, based on the corresponding color and texture information. The feature descriptor r for each node is thus based in part on a plurality of visual attributes of the corresponding superpixel 808. In this example, the visual attributes upon which the feature descriptors are based comprises two color metrics and a texture metric. Specifics of feature extraction in this example embodiment is described in greater detail later herein.

At operation 731, a weighting value (also referred to a weight) is calculated for each edge 816 based on a metric that defines distances between the feature descriptors of the corresponding nodes. A weight matrix $W=[w_{ij}]_{n \times n}$ is constructed based on the calculated weights for the respective edges 816. At operation 735, the set of edges E is quantified by the weight matrix W to produce a weighted graph for the image 606. It will be seen that the method 700 includes the generation of a weighted graph using the previously constructed graph and calculating a weighting value for each edge 816 based on visual attributes of those superpixels 808 corresponding to the respective pair of nodes connected by the relevant edge 816. The calculation of the edge weights and the formation of the weighted graph will be described in greater detail with reference to FIG. 10.

Thereafter, at operation 739 (FIG. 7), the weighted graph is used in combination with the input image 606 to construct the saliency map $S^i$ for the image 606. As described previously, the resultant saliency map $S^i$ is thereafter employed for extracting the foreground features of the input image 606. The construction of the saliency map, at operation 739, will be described at greater length below with reference to FIG. 12.

Figure 9:
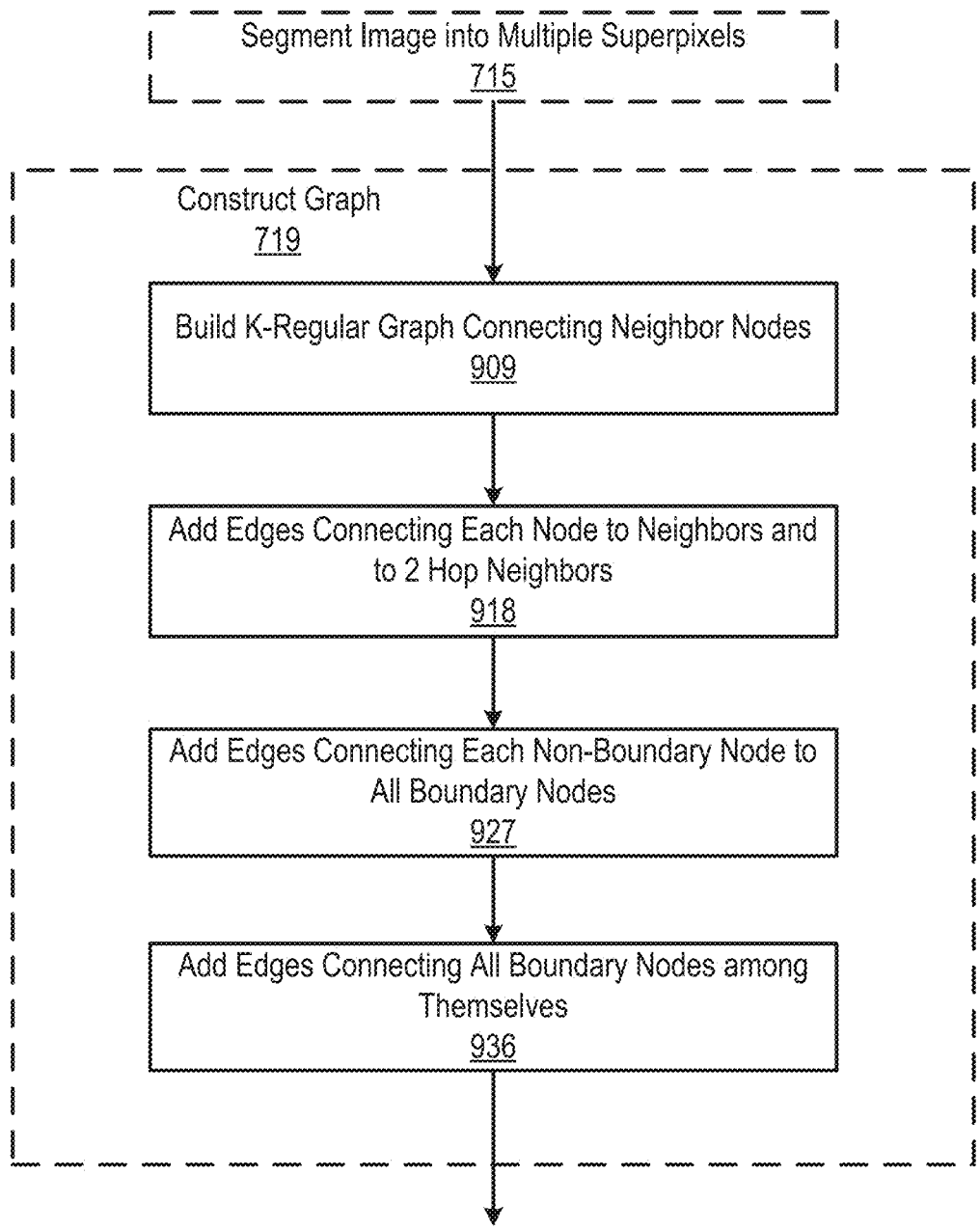
FIG. 9 is a schematic flow chart illustrating an automated procedure for constructing a graph during automated saliency map estimation, according to one example embodiment.

Some of the operations described broadly with reference to FIG. 7 will now be discussed at greater length. FIG. 9 shows a schematic flow chart of a procedure for constructing the image graph, at operation 719, as part of the method 700 (FIG. 7), according to one example embodiment. Given the set of superpixels S produced by segmentation of the image 606 into multiple superpixels 808, at operation 715, the graph construction procedure starts by building, at operation 909, a k-regular graph in which each node (i.e., each superpixel 808) is connected only to its immediate neighbors. Note that, in this description, the term neighbor, neighbor superpixel, and neighbor nodes refer to superpixels (or their corresponding nodes) that spatially border one another in the segmented image 606. In FIG. 8A, for example, a focus superpixel 808 (whose connected edges 816 are shown), is connected by respective edges to four neighbor superpixels 808 that are contiguous with the focus superpixel 808. Spatially non-contiguous nodes are referred to herein as non-neighbor nodes, even if they are connected by an edge 816 forming part of the graph. In FIG. 8A, those edges that connect the focus node to neighbor nodes are represented by thicker solid lines and are indicated by reference numeral 816n.

Expressed mathematically, the adjacency matrix of the initial graph G is defined to be $A=[a_{ij}]_{n \times n}$. If $a_{ij}=1$, then nodes $s_i$ and $s_j$ are neighbors, otherwise $a_{ij}=0$. As G is undirected, it is required that $a_{ij}=a_{ji}$. $B \in S$ denotes a set of boundary nodes containing |B| superpixels 808 on the four borders of the input image 606. In FIG. 8A, superpixels of boundary nodes are indicated by reference numeral 808b. It can thus be seen that the set of nodes includes a subset of boundary nodes, each of which corresponds to a respective superpixel 808b located at an image boundary.

Thereafter, edges are added to the initial graph G to build an extended graph based on the following rules:

(1) Each node is connected, at operation 918 (FIG. 9), with respective edges to both its immediate neighbors and two-hop neighbors. A two-hop neighbor is any node that is a non-neighbor of the focus node, and that is a neighbor of a neighbor of the focus node. FIG. 8A shows those edges added to the graph in accordance with this first rule (denoted $R_1$). For clarity of illustration, the relevant nodes for only a single focus node is illustrated, but it should be appreciated that these edges are added for each node in the segmented image. In FIG. 8A, edges connecting neighbor nodes are represented by thicker solid lines and are indicated by reference numeral 816n. Likewise, edges connecting two-hop neighbors are represented by thinner solid lines and are indicated by reference numeral 816t.

Figure 8B:
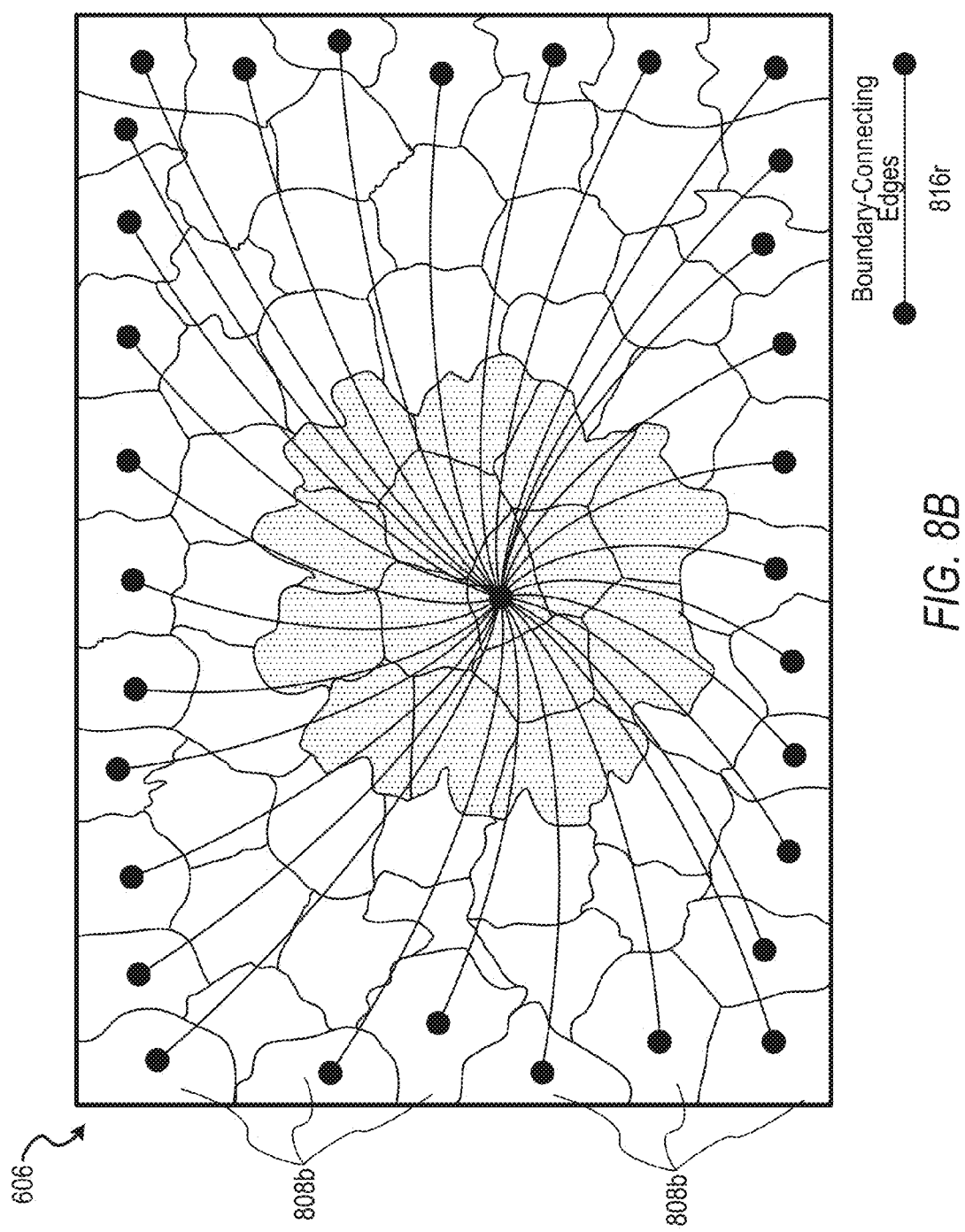

(2) Each non-boundary node is connected, at operation 927 (FIG. 9), to all of the boundary nodes 808b. FIG. 8B shows those edges added to the graph in accordance with this second rule (denoted $R_2$). In this description, the term boundary-connecting edges refer to edges added according to $R_2$. Again, for clarity of illustration, the radial pattern of boundary-connecting edges are shown in FIG. 8B for only a single focus node, but note that such a set of edges is added for each non-boundary node. In FIG. 8B, edges connecting the non-boundary node to boundary nodes 808b in accordance with $R_2$ are indicated by reference numeral 816r. Note that, in the calculation of the weight matrix, a weighting value for each boundary-connecting edge 816r is given by dividing a corresponding weighting metric by the total number of boundary nodes 808b. Existing graph models referenced herein does not provide for incorporation of boundary-connecting nodes according to $R_2$.

Figure 8C:
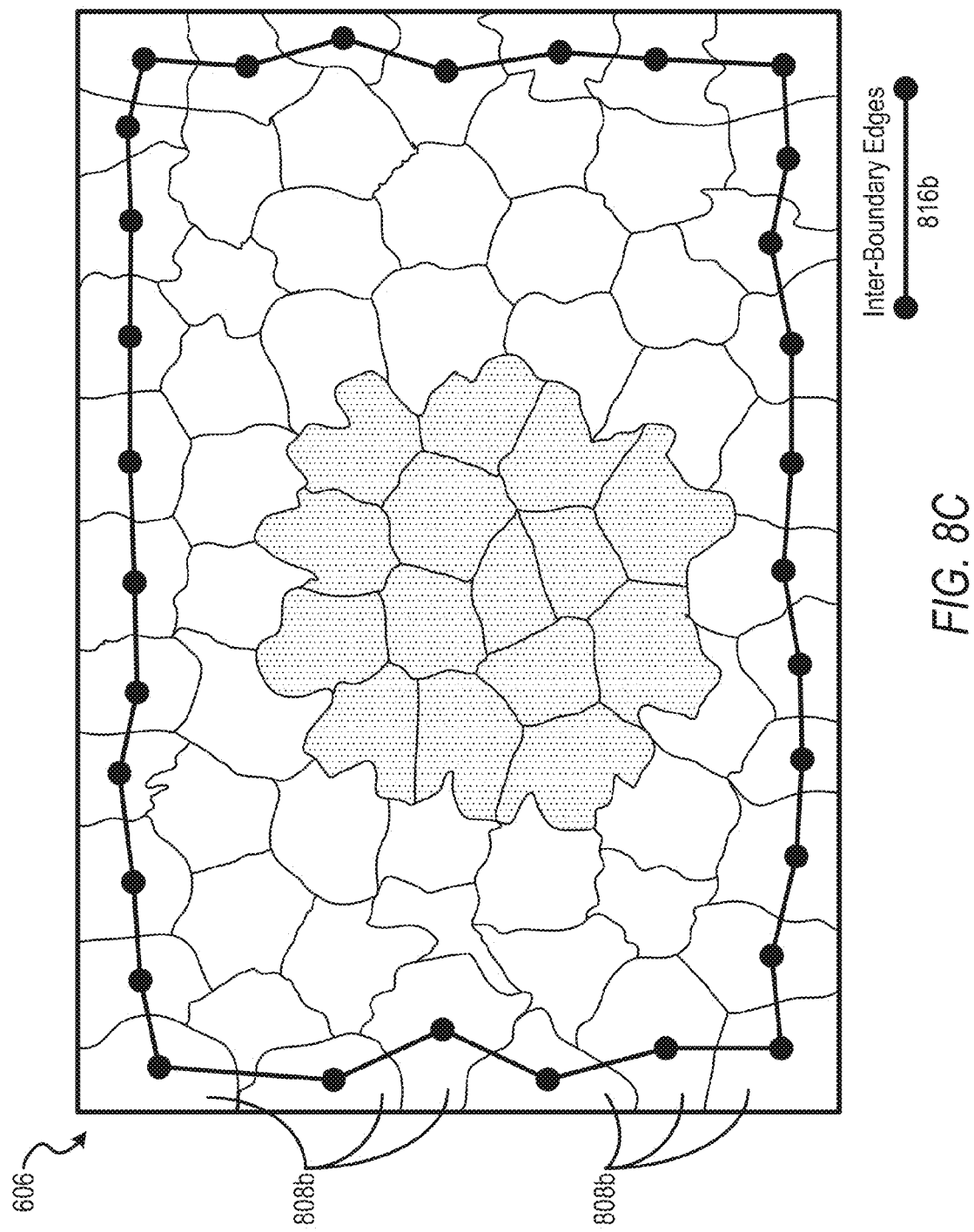

(3) All boundary nodes are connected, at operation 936 (FIG. 9), among themselves, so that any pair of nodes on the image boundary is considered to be connected. In FIG. 8C, the inter-boundary nodes added to the graph accordance with this third rule (denoted $R_3$) are represented by a single ring of edges connecting neighbor boundary nodes 808b, shown as solid lines indicated 816b. Note, however, that the inter-boundary edges 816b added in accordance with rule $R_3$ include not only those edges connecting neighbor nodes on the image boundary, but also includes respective edges connecting each boundary node 808b with each other boundary node 808b.

Mathematically, construction of the final edge set E={E$_1$, E$_2$, E$_3$} by above-described rules R$_1$, R$_2$, and R$_3$ can be expressed as follows:

$$R_1 : \varepsilon_1 = \{(s_i, s_j) | s_i, s_j \in S, a_{ij} = 1\}$$

$$\cup \{(s_i, s_k) | s_k \in S, a_{kj} = 1\},$$

$$w_{ij} = \text{weight}(r_i, r_j).$$

$$R_2 : \varepsilon_2 = \{(s_i, s_j) | s_i \in S, s_j \in B\},$$

$$w_{ij} = \text{weight}(r_i, r_j) / |B|.$$

$$R_3 : \varepsilon_3 = \{(s_i, s_j) | s_i, s_j \in B\}$$

$$w_{ij} = \text{weight}(r_i, r_j). \quad (1)$$

FIG. 8D shows a resultant graph structure 870 with respect to a single non-boundary focus node resulting from application of these rules. Midget be remembered that each of the nose auction. It should be remembered that each of the nodes has a similar graph structure. As will be seen later, saliency map estimation is based on spectral graph clustering by comparison of the graph structures 870 (and, in particular, of associated edge weights) for respective nodes.

It will be appreciated that, since neighbor superpixels 808 are more likely to be visually similar, the neighbor edges 816n and two-hop edges 816t provided by R$_1$ promotes effective utilization of local neighborhood relationships between the superpixel nodes. Connection of each node to all boundary nodes by respective boundary-connecting edges 816r according to R enforces a global contrast constraint. As mentioned, since the number of boundary superpixels may be large, the edge weights for these boundary-connecting edges 816r are averaged, making the total contribution of boundary nodes 808b to a particular non-boundary node during graph clustering equivalent to that of a single superpixel 808. The inter-boundary edges 816b added in accordance with R$_3$ enforces the graph to be closed-loop. Combined with R$_2$, which connects each superpixel to all boundary nodes 808b, R$_3$ further reduces the geodesic distance of two similar superpixels.

Figure 10:
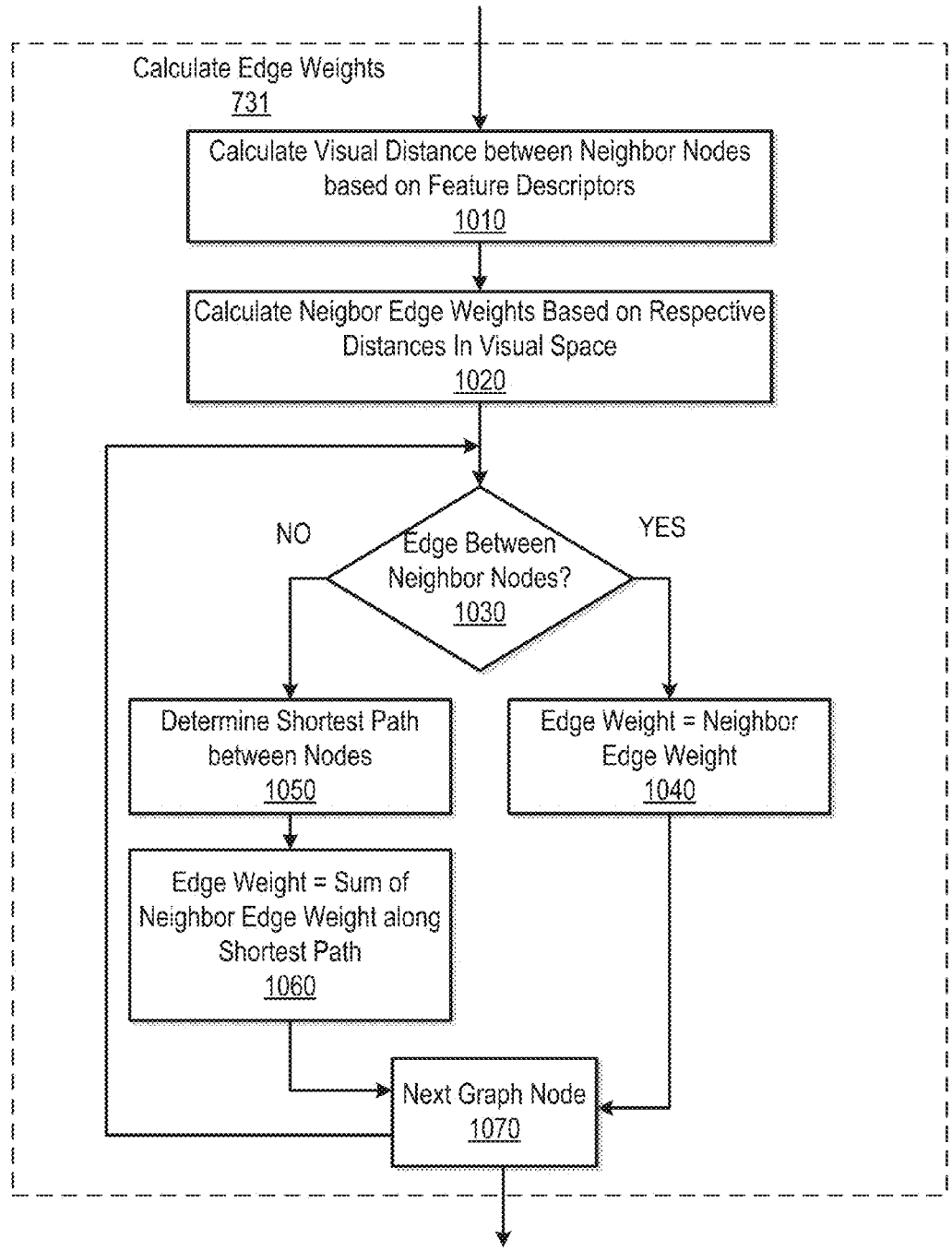
FIG. 10 is a schematic flow chart illustrating an automated procedure for calculating edge weights to generate a weighted graph during automated saliency map estimation, according to an example embodiment.

FIG. 10 shows a schematic flow chart of a procedure for calculating weighting values (at 731, FIG. 7) and producing the weighted graph (at 735, FIG. 7), according to an example embodiment. Recall that extracting feature descriptors from each superpixel is in this example embodiment pertinent to estimation of the final saliency map, as the edge weights are calculated by comparing the feature descriptors of the relevant nodes. An effective feature descriptor should exhibit high contrast between salient and non-salient region. In this example, feature descriptors are mainly based on color and texture information.

In this example embodiment, two color metrics are employed, namely mean color values and color histograms for each superpixel 808. In particular, the color histograms and mean color values in this example embodiment are expressed in the CIELAB color space. In combination with the color metrics, a texture metric is employed for forming the respective feature descriptors, in this example embodiment being responses from the Leung-Malik (LM) filter.

At operation 1010, a distance between neighbor nodes in the visual space is calculated based on the feature descriptors of the relevant pair of nodes. Note that the distance between nodes (and related terms such as a shortest path) refer not to spatial difference between the nodes, but to distance between the nodes in the visual space defined by the feature descriptor metrics. In this example embodiment, with $v^{lab}$, $h^{lab}$, $h^{tex}$ respectively denoting the mean L*a*b* color, L*a*b* histogram and max LM response histogram, the distance between two superpixels 808 is defined as, $$\text{dist}(r_i, r_j) = \lambda_1 \|v_i^{lab} - v_j^{lab}\| \lambda_2 x^2(h_i^{lab}, h_j^{lab}) + \lambda_3 x^2(h_i^{tex}, h_j^{tex}). \quad (2)$$

Where:
  $r = (v, h^{lab}, h^{tex})$ is the combined feature descriptor of a superpixel 808;
  $\lambda_1$, $\lambda_2$, and $\lambda_3$ are weighting parameters; and $$\chi^2(h_1, h_2) = \sum_{i=1}^{K} \frac{2(h_1(i) - h_2(i))^2}{h_1(i) + h_2(i)}$$

is the chi-squared distance between histograms h$_1$ and h$_2$, with K being the number of bins.

Equation (2) thus provides for the calculation of a distance value quantifying a difference between visual attributes of a particular pair of nodes. Note that, in this example embodiment, the distance values are calculated only for neighbor nodes (i.e., nodes corresponding to superpixels 808 sharing a spatial boundary). Expressed differently, the distance metric defined by Equation (2) is applied only to those edges forming part of the original adjacency matrix G (indicated in FIGS. 8A and 8D by reference numeral 816n). This is because, as will be seen in what follows, the weight for edges 816 connecting non-neighbor nodes are in this example embodiment determined not by the visual distance between the nodes at the ends of the relevant edge 816, but by the geodesic distance in the visual space between the relevant nodes.

At operation 1020, a weighting value (or weight) is calculated for each edge 816n connecting neighbor nodes based on the corresponding distance value. In this example, the weights are defined as:

$$\text{weight}(r_i, r_j) = \exp(-\text{dist}(r_i, r_j)/\sigma^2)$$

where σ is a constant.

Combination of these edge weights with the original adjacency matrix G provides an undirected weighted adjacency matrix indicating the weights of edges 816n connecting all of the respective pairs of neighboring nodes in the segmented image 606. It will be noted that the weight metric in this example as an inverse relationship to the distance metric. In other words, the more visually similar two compared nodes are, the smaller is the distance metric, and the larger is the weight metric.

As mentioned, this disclosure introduces incorporation of a shortest path or geodesic distance metric in graph weighting. In this example embodiment, the edge weights for edges 816 connecting non-neighboring nodes are determined based on respective shortest paths between the relevant pair of nodes connected by the edge 816. In particular, the edge weights are in this example obtained with the following Gaussian similarity function:

$$\text{weight}(r_i, r_j) = \begin{cases} \exp(-\text{dist}(r_i, r_j)/\sigma^2) & \text{if } a_{ij} = 1, \\ \min_{p_1 = r_i, p_2 = r_{i+1}, \ldots, p_m = r_j} \\ \sum_{p=1}^{m-1} \text{weight}(p_k, p_{k+1}) & \text{if } a_{ij} = 0 \end{cases} \quad (3)$$

where σ is a constant.

In Equation (3), the previously described weighting value is assigned to any edge that is a neighbor edge 816*n*, being an edge that connects nodes corresponding to spatially neighboring superpixels 808. The second condition in Equation (3) determines the shortest path between any pair of nodes connected by a non-neighbor edge 816. The considered paths extend between the relevant pair of nodes and comprises a sequence of one-hop edges (also referred to herein as neighbor node edges 816*n*). In this context, path length (in the visual space) may be expressed as a cumulative value for the distance values of the one-hop edges along the shortest path. The weight assigned by Equation (3) to non-neighbor nodes are thus equivalent to the sum of the weights respective one hop edges 816*n* that together define the shortest path between the considered pair of non-neighbor nodes.

Figure 11:
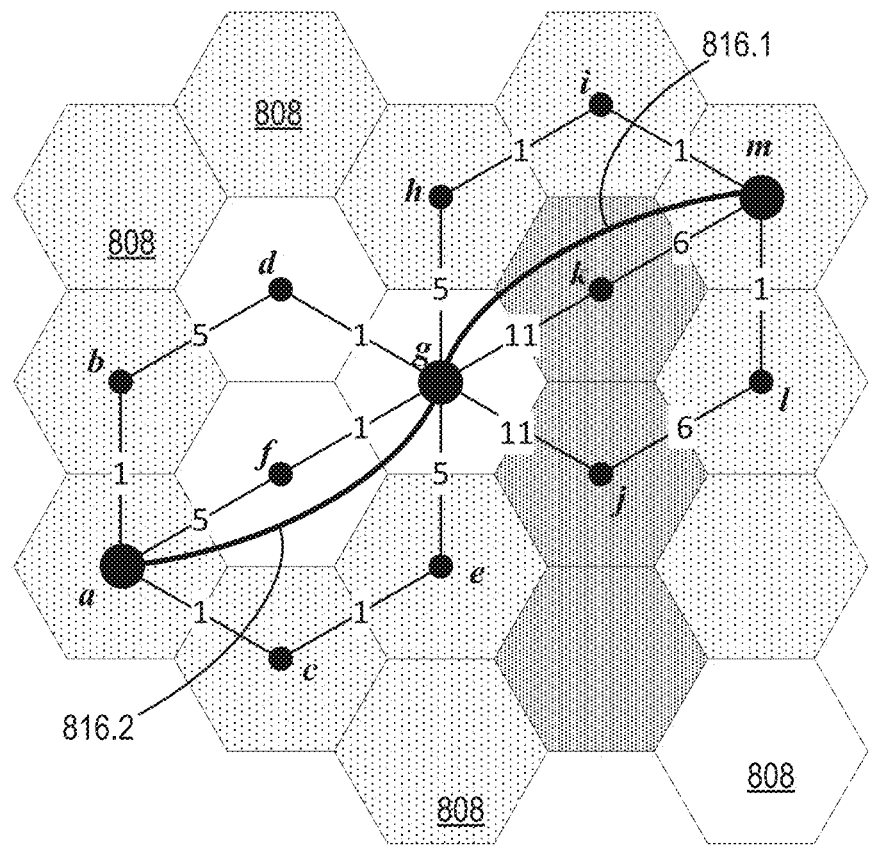
FIG. 11 is a schematic illustration with reference to part of a fictional segmented image of a geodesic distance constraint applied during graph construction, according to an example embodiment.

The concept of the shortest path or geodesic distance will ow briefly explained with reference to FIG. 11, which, for the purposes of illustration, shows a fictional set of nodes and edges 816. For ease of illustration, the respective superpixels 808 in FIG. 11 are simplified to be shown as regular hexagons. The distance values used in FIG. 11 are furthermore wholly fictional and are arbitrarily chosen for illustration purposes only. In FIG. 11, the nodes involved are alphabetically distinguished for ease of description. Each of the one hop edges included in FIG. 11 is furthermore shown with an associated distance value indicated centrally on the line representing that edge. Note that the distance value increases with an increase in visual difference between the associated nodes. For example, the distances between virtually identical nodes d, g, and f has an example value of 1, while the distance of edge g-k, connecting nodes with a significant visual difference, has an example distance value of 11.

To illustrate, the respective shortest paths are considered for edge 816.1 extending between nodes g and m, and for edge 816.2 extending between node a and g. Looking first at edge 816.1, it will be seen that the cumulative distance along path gkm is 17, along path gjlm is 18, and along path ghim is 7. Therefore, the geodesic distance for edge 816.1 is 7 and the shortest path is ghim. The edge weight assigned to edge 816.1 in accordance with Equation (3) is therefore the sum of the weights of edges gh, hi, and im.

Turning now to edge 816.2, it will be seen that the weights for the relevant candidate paths in this instance is as follows: for path geca, 7; for path gfa, 6; and for path gdha, 7. The shortest path for edge 816.2 is thus path gaf, and the geodesic distance is 6. The edge weight assigned to edge 816.2 in accordance with equation (3) is the sum of the respective edge weights of hgf and hif.

It will be noted from these examples that provision of the geodesic distance constraint in edge weighting results in edge weights that can be significantly different from that which would have been given by mere comparison of the nodes at the ends of the edges. In particular, note that the visual difference between the nodes connected by edge 816.1 is in this example embodiment identical to the visual difference between the nodes connected by edge 816.2, yet these edges are provided with different weight values due to their different geodesic distances (7 as opposed to 6). This is because a visually distinctive feature is located between node g and node m, but no such feature is present between node g and node a. It will be appreciated that such differences in geodesic distances can be stark, as would be the case if the distinctive feature between nodes g and m in this example were uninterrupted at node h or node i.

It can thus be seen that provision of the geodesic constraint in node weighting in accordance with this disclosure results in edge weights that, at least to some extent, are sensitive to visual features between the connected nodes.

Returning now to FIG. 10, it will be seen that the calculation of the edge weights, at operation 731, includes, for each edge forming part of the expanded graph constructed in accordance with $R_1$, $R_2$, and $R_3$, determining, at operation 1030, whether or not the relevant edge 816 is a neighbor edge (or 1-hop edge) that connects nodes spatially contiguous neighbor nodes. If so, the edge weight assigned to the relevant edge 816 is the neighbor edge weight given by the first condition of Equation (3), being based directly on the distance between the feature descriptors of the corresponding superpixels 808.

If, however, the edge 816 under consideration extends between non-neighbor edges, then the second condition of Equation (3) is employed to determine, at operation 1050, the shortest path between the nodes at opposite ends of the edge 816, and to assign, at operation 1060, the weight given by the second condition of Equation (3). These operations are performed loopwise, as indicated by operation 1070, until a respective weight is calculated for each edge 816 in the set of edges E.

Note, again, that the above-described operations from the segmentation of the image into multiple superpixels onwards are performed separately for each differently scaled version of the image 606. In this regard, the method 700 in this example embodiment includes, without any prior knowledge of the size of the salient object, adopting the L-layer Gaussian pyramid for robustness. The lth level pyramid $I^l$ is obtained as:

$$I^l(x, y) = \sum_{s=-2}^{2} \sum_{t=-2}^{2} \omega(s, t) I^{l-1}(2x+s, 2y+t), l \geq 1. \quad (4)$$

where $I^0$ is the original image, and w(s, t) is a Gaussian weighting function (identical at all levels). The number of superpixels $n^l = |S^l|$ for the l-th level pyramid $I^l$ is set as:

$$n^l = \frac{n^{l-1}}{2^{2(l-1)}} \quad (5)$$

As shown schematically in FIG. 6, multiscale features $r^l$ are extracted, and weight matrices $W^l$ are built for each level. Recall also that the final saliency estimation is conducted on each level independently, and the output saliency map $S^c$ is combined using results from all levels.

Figure 12:
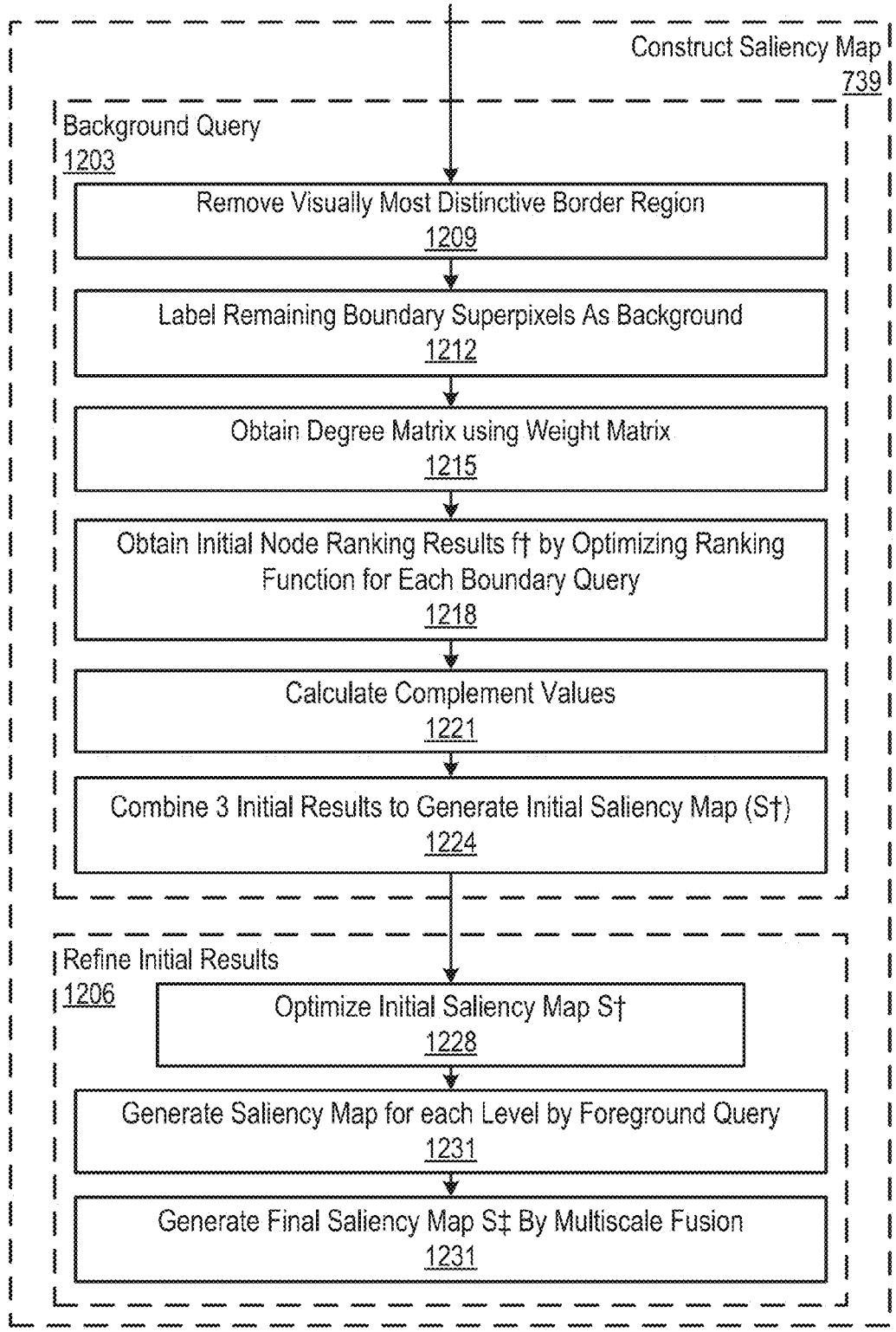
FIG. 12 is a schematic flow chart illustrating an automated procedure for constructing a saliency map based on a weighted graph, according to one example embodiment

FIG. 12 shows a schematic flow chart of a procedure for constructing the saliency map $S^{\frac{c}{c}}$ (at 739, FIG. 7), according to an example embodiment. Given the weighted graph previously constructed, either foreground nodes or background nodes can be used as queries. In this example embodiment, saliency map construction is based on background priors, which in this instance consists of two parts: the boundary prior and the connectivity prior.

The boundary prior is based on the observation that the salient object seldom touches the image borders. Compared to the center prior, which assumes that the salient object is in the center of an image, the boundary prior is more robust. In this embodiment, three out of the four borders of the image 606 are chosen as background seeds to perform queries. See in this regard Li, et al. (referenced earlier). This is because the foreground object may complete occupy one border of the image, which is commonly seen portrait photos. Therefore, eliminating that border with the most distinctive appearance generates more accurate results.

The connectivity prior is based on the tendency for background regions to be large and homogenous. Therefore, superpixels 808 in the background can typically be easily connected to each other. Note that the connectivity prior is also applicable for images with a shallow depth of field, in which the background region is out of focus.

The construction of the saliency map $S^{\ddagger}$, at 739, is schematically illustrated in FIG. 12 to comprise two broad procedures of first performing the initial background query, at operation 1203, and thereafter performing refinement, at operation 1206, based on the connectivity prior.

To promote more accurate saliency estimations, the four borders of the image 606 are first compared, and the border with the most distinctive color distribution or visual appearance is removed, at operation 1209. In this example embodiment, this procedure comprises combining the boundary superpixels 808b of each border together to form each border into a single region. Equation (2) is then employed to compute the distance of any two of the four regions. The resulting 4×4 matrix is summed column-wise. The maximum column from this summation indicates the border region that is visually most distinctive, as defined in this example by the corresponding feature descriptor. The distinctive border region thus identified is then removed.

Once the query boundaries are obtained by elimination of the most distinctive border region, the border superpixels 808b of the remaining boundaries are labeled as background, at operation 1212. More formally, a query vector $y=[y_1, y_2, \ldots, y_n]^T$ is built where $y_i=1$ for superpixels 808 belonging to one of the three query boundaries, otherwise $y_i=0$. Thereafter, the previously calculated weight matrix $W=[w_{ij}]n \times n$ is used to obtain, at operation 1215, a degree matrix $D=\text{diag}(d_1, d_2, \ldots, d_n)$, where $d_i = \Sigma_j w_{ij}$.

At operation 1218, a ranking function is optimized for each of the three boundary queries, to obtain three ranking results $f^{\varsigma}$ (b), where b corresponds to one of the three borders. Each ranking result $f^{\varsigma}$ indicates the background relevance of each node. In this example embodiment, the ranking function to assign rank values $f=[f_1, f_2, \ldots f_n]^T$ is defined as the following minimization problem:

$$f^{\dagger} = \arg\min_f \frac{1}{2}\left( \sum_{i,j=1}^n w_{ij} \left\| \frac{f_i}{\sqrt{d_i}} - \frac{f_j}{\sqrt{d_j}} \right\|^2 + \mu \sum_{i=1}^n \|f_i - y_i\|^2 \right) \quad (6)$$

where $\mu$ is a controlling parameter. The optimized solution is given as:

$$f^{\dagger} = \left(D - \frac{W}{\mu+1}\right)^{-1} y. \quad (7)$$

Because the ranking results $f^{\varsigma}$ (b) show the background relevance of each node, the complement values are calculated, at operation 1221, to obtain respective foreground-based saliency:

$$Si(b)=1-f_i^{\varsigma}(b), i=1,2, \ldots, n. \quad (8)$$

The respective results are thereafter put into element-wise multiplication, at operation 1224, to calculate the initial saliency map $S^{\varsigma}$:

$$S^{\dagger} = \prod_b Si(b). \quad (9)$$

The initial saliency map $S^{\varsigma}$ is in this example embodiment further refined, at operation 1206. First, the initial saliency map $S^{\varsigma}$ is optimized, at operation 1228, to derive a preliminary optimized result $f^{\ast}$. In this example embodiment, this optimization comprises minimizing a cost function designed to assign a value of 1 to a salient region, and a value of 0 to a background region. Thus, the optimized result is obtained by minimizing the following cost function:

$$f^{\ast} = \arg\min_f \left( \sum_{i=1}^n F_i(f_i-1)^2 + \sum_{i=1}^n B_i f_i^2 + \sum_{i,j} w_{ij}(f_i-f_j)^2 \right) \quad (10)$$

where $F_i$ and $B_i$ are foreground and background probabilities respectively, $F_i>\text{mean}(S_i)$ and $F_i>\text{mean}(S_i)$. The three terms are all squared errors, and the optimal result is computed by the least squares method. The newly obtained result $f^{\ast}$ is a binary indicator vector, and is usable for foreground queries.

A saliency map for each scale level is obtained, at operation 1231, by reapplying Equation (7) using the preliminary optimized result $f^{\ast}$ as foreground query:

$$S^{\ddagger} = \left(D - \frac{W}{\mu+1}\right)^{-1} f^{\ast}$$

Thereafter, a final saliency map $S^{\ddagger}$ is generated by multi-scale fusion, at operation 1235, of the respective saliency maps for different levels of the input image 606.

A benefit of the disclosed techniques is that they provide for improved accuracy and reliability of saliency map estimation, when compared to existing techniques. The described graph model incorporates local and global contrasts, and naturally enforces the background connectivity constraint more effectively than in existing techniques. Disclosed features that promotes these benefits include provision of the boundary-connecting edges consistent with $R_2$ (thereby more effectively capturing local/global contrast and more effectively utilizing the boundary prior), and inclusion of the described geodesic distance constraint in edge weighting. Note that the geodesic distance or shortest path is here applied as a constraint in graph weighting, as opposed to calculation of a saliency measure as in Wei, et al. This constraint tends more effectively to enforce the background connectivity prior than is the case with existing techniques.

Moreover, the disclosed feature distance metrics (based on the discussed color metrics and texture metric) more efficiently combines local color and texture queues, to more accurately represent the intrinsic manifold structure.

The above-described graph structure and graph weighting techniques were developed as a solution to the technical problem of increasing the robustness, accuracy, and reliability of automated saliency detection for images. Based on the observed improved accuracy and reliability of superpixel node ranking resulting from (a) inclusion in the graph structure of boundary-connecting nodes for each non-boundary node and/or (b) edge weight calculation that takes into account a geodesic distance or shortest path constraint for at least some nodes, certain systems and methods are disclosed for performing automated ranking operations in particular specified technical fields by use of graph construction and/or graph weighting analogous to that disclosed above with reference to automated saliency map estimation.

An aspect of the disclosure provides for a method and system for web content searching and/or ranking. Such methods include at least one of (a) constructing a web content graph in which each node is connected to at least one boundary node or representative background node, and (b) generating a weighted graph by calculating respective edge weights based, at least for some of the edges, on a geodesic distance or shortest Path constraint.

A search engine provided in accordance with this aspect is in some embodiments configured for performing a webpage search that returns as a search result a ranking of webpages for their respective relevancy to a user-provided search query. Persons skilled in the art will appreciate that such a search engine may be configured to perform a website search in a manner analogous to existing PageRank techniques, but including the improvements wherein graph construction and/or edge weighting is performed in the manner disclosed herein. In some embodiments, each node represents respective webpage.

Feature descriptors for the respective nodes may in conventional fashion be defined by a number of clicks and/or by webpage content, such as images, text, and/or metadata, or a combination of these features. It will be appreciated that the distance between respective nodes in such cases represent the dissimilarity in content between the corresponding webpages. Textual similarities may in some embodiments be expressed by a word histogram and/or by a bag-of-words model, as is the case in some existing page ranking techniques. In some embodiments, the method may include producing word embeddings, for example by determining respective word vectors. Word2Vec, for example, is a group of related models that are used to produce word embeddings. These models are shallow, two-layer neural networks that are trained to reconstruct linguistic contexts of words. Word2vec takes as its input a large corpus of text and produces a high-dimensional space (typically of several hundred dimensions), with each unique word in the corpus being assigned a corresponding vector in the space. Word vectors are positioned in the vector space such that words that share common contexts in the corpus are located in close proximity to one another in the space.

Some embodiments of the method and system for creation based page ranking provides for calculating edge weights between respective non-neighbor nodes based on identification of the geodesic distance or shortest path (as expressed in the dimensions defined by the feature descriptors/vectors), analogous to that described previously with reference to FIG. 11.

Constructing a graph representative of webpages or other web content which is to be ranked in some embodiments include the provision of edges according to rules R1, R2, and R3 as previously described. The resultant graph thus includes boundary-connecting edges consistent with R2 of the previously described set of graph-building operations. For these purposes, boundary nodes are in some embodiments defined as nodes more distant from the query than a predefined threshold, or nodes that are identified as noise. In some embodiments, Web content graph construction may comprise connecting each node in the graph to a single real or virtual boundary node. In such cases, the calculated weight for the corresponding edge is not averaged, but is applied to the American connecting edge is calculated.

A method of performing a online search based on a user-provided query in some embodiments comprise receiving a search query from a user, converting the search query to a vector consistent with feature descriptor/vector calculation for respective nodes, and ranking the nodes of the graph for similarity to the search query based on automated graph analysis of the weighted graph using the search query vector as a foreground query, or in some instances deriving a background query from the search query and thereafter performing a ranking function for similarity to the background query, similar to that described in the context of image processing.

Another aspect of the disclosure provides for a method and a system for automated provision of product/item recommendations to users. Such methods may provide for automated generation and communication to the user of recommendations, for example, for products for purchase in an online marketplace, for articles of interest specific to a particular website (such as, for example, book or movie recommendations). Such a method in some embodiments include at least one of (a) constructing an item/product graph in which each node is connected to at least one boundary node or representative background node, and (b) generating a weighted graph by calculating respective edge weights based, at least for some of the edges, on a geodesic distance or shortest Path constraint.

In some embodiments, respective nodes may include collections or categories of items/products associated with respective users, in which case a feature descriptor for each node may defined as a vector representing similarity and content of the respective nodes. In other embodiments, each node may be a respective item/product, such as a respective book, movie, article of clothing, item listing, or the like.

Yet another aspect of the disclosure provides for a method and a system for automated ranking of people/organizations in a social network. Such methods in some embodiments provide for automated generation of network connections or connection prompts between different people in the network based on a similarity ranking estimated based on a weighted graph constructed in an automated procedure that includes at least one of: (a) constructing a social network graph having nodes representing respective persons/organizations, each node being connected to at least one boundary node or a representative background node (each node in some embodiments being connected to all boundary nodes); and (b) generating the weighted graph by calculating respective edge weights based, for at least for some of the edges, on a geodesic distance or shortest path constraint in a virtual space defined by feature descriptors vectors of the respective nodes. In some embodiments, the feature descriptors for nodes in a social network may include demographic information, historic behavior information, social network activity, number of social network connections, or the like. Persons of skill in the art will appreciate various existing techniques combinable with the disclosed improvements to provide for automated ranking in social networking applications.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors)

may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-12 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 13:
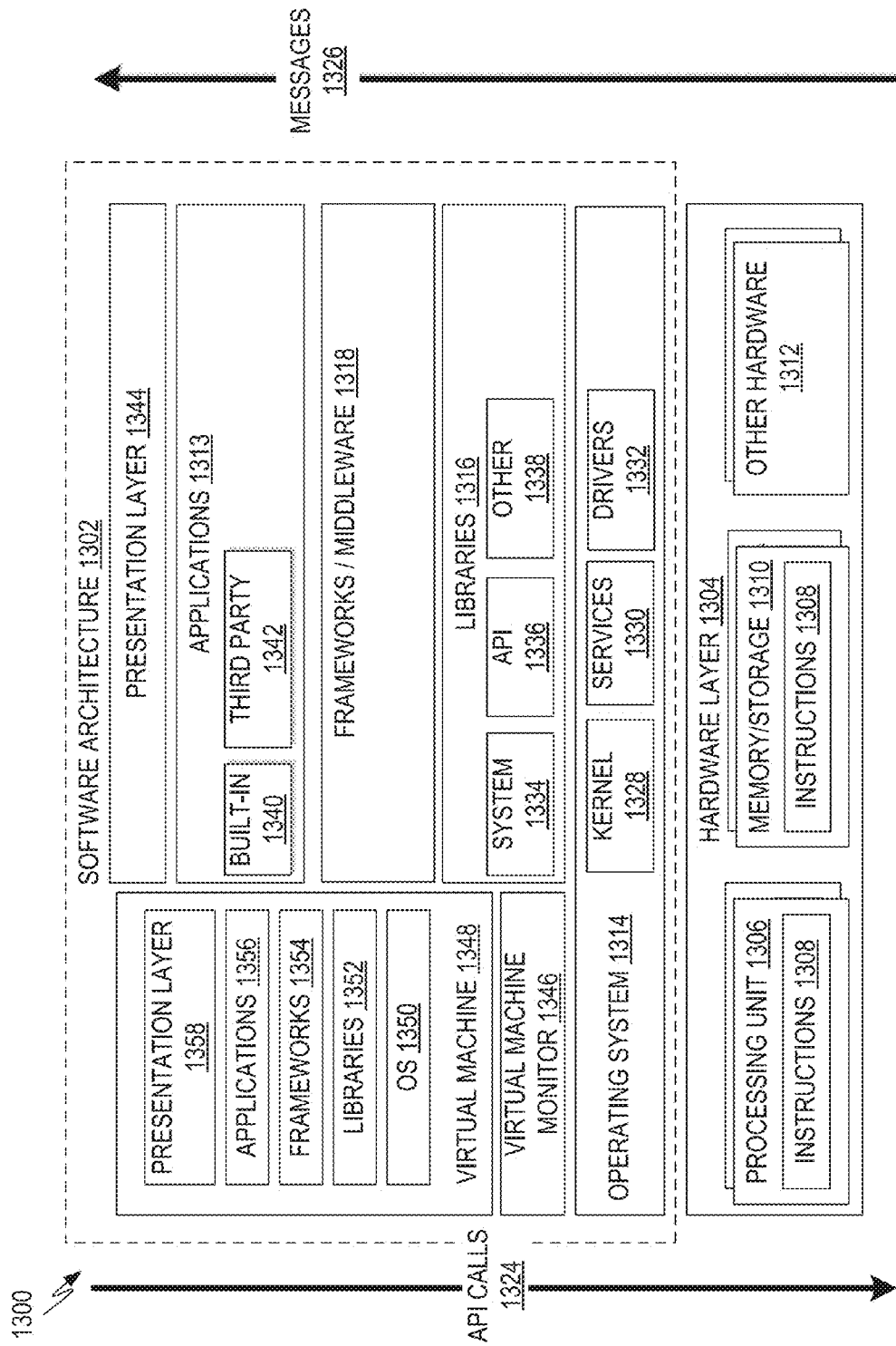
FIG. 13 is a block diagram illustrating an example of a software architecture that may be installed on a machine, according to some example embodiments.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 1-3. Hardware layer 1304 also includes memory and/or storage modules 1310, which also have executable instructions 1308. Hardware layer 1304 may also comprise other hardware as indicated by 1312 which represents any other hardware of the hardware layer 1304, such as the other hardware illustrated as part of machine 1400.

In the example architecture of FIG. 13, the software 1302 may be conceptualized as a stack of layers where each layer provides particular functionality. For example, the software 1302 may include layers such as an operating system 1314, libraries 1316, frameworks/middleware 1318, applications 1320 and presentation layer 1322. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system 1334 libraries (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 includes built-in applications 1340 and/or third party applications 1342. Examples of representative built-in applications 1340 may include, but are not limited to, a contacts application, a browser application, a book reader application, a location application, a media application, a messaging application, and/or a game application. Third party applications 1342 may include any of the built in applications as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system such as operating system 1314 to facilitate functionality described herein.

The applications 1320 may utilize built in operating system functions (e.g., kernel 1328, services 1330 and/or drivers 1332), libraries (e.g., system 1334, APIs 1336, and other libraries 1338), frameworks/middleware 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware machine (such as the machine of FIG. 14, for example). A virtual machine is hosted by a host operating system (operating system 1314 in FIG. 14) and typically, although not always, has a virtual machine monitor 1346, which manages the operation of the virtual machine as well as the interface with the host operating system (i.e., operating system 1314). A software architecture executes within the virtual machine such as an operating system 1350, libraries 1352, frameworks/middleware 1354, applications 1356 and/or presentation layer 1358. These layers of software architecture executing within the virtual machine 1348 can be the same as corresponding layers previously described or may be different.

Example Machine Architecture and
Machine-Readable Medium

Figure 14:
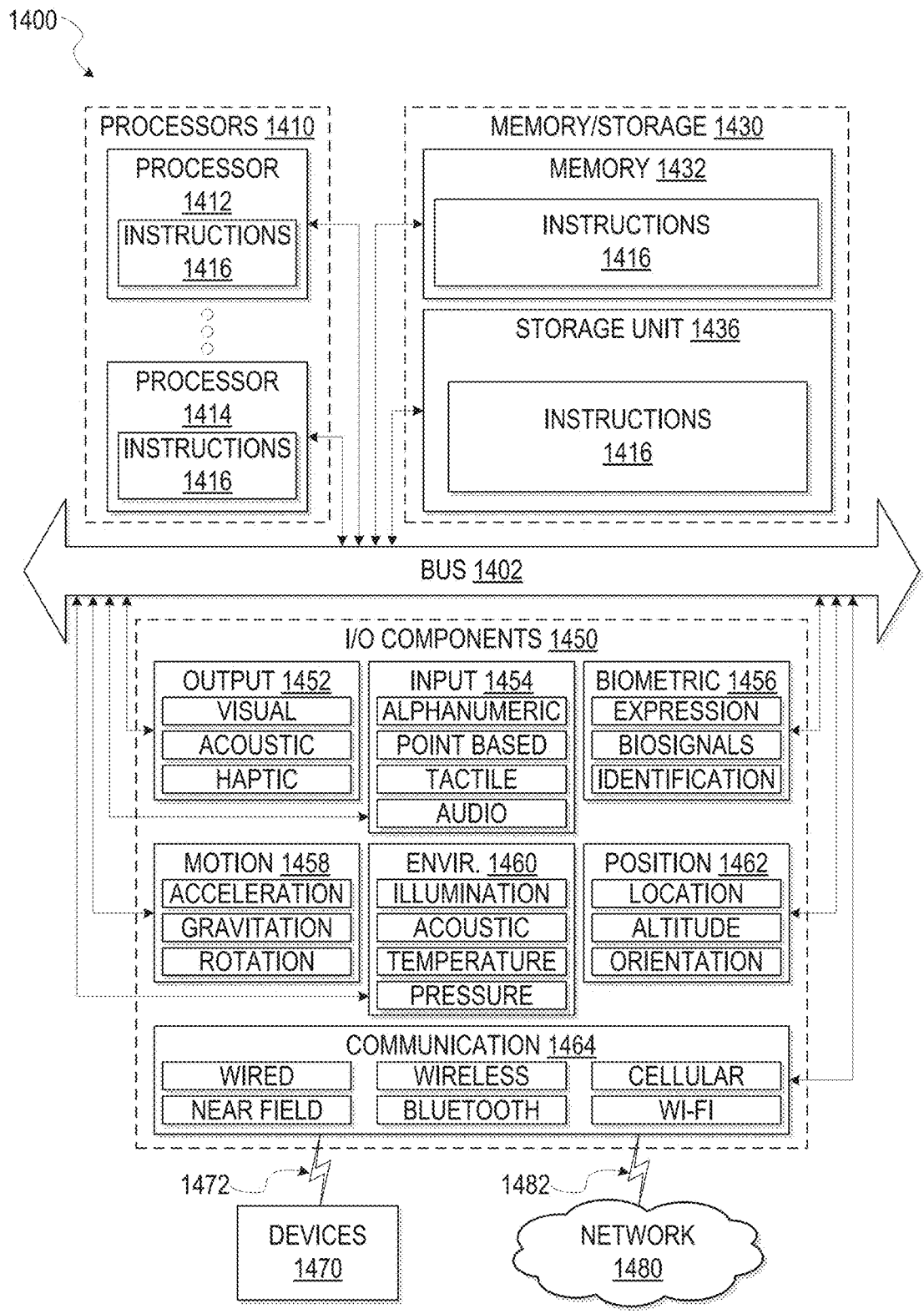
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions may cause the machine to execute the flow diagrams of FIGS. 3-7, 9, 10, and 12. Additionally, or alternatively, the instructions may implement the respective components illustrated with reference to FIGS. 2 and 3, and so forth. The instructions transform the general, non-programmed machine into a particular machine programmed to carry out the described and illustrated functions in the manner described.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include multi-core processor that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core process), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472 respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra. Code, UCC RSS-2D bar code, and other optical codes), or acoustic detection components (e.g., microphones to identify tagged audio signals). In addition, a variety of information may be derived via the communication components 1464, such as, location via Internet Protocol (IP) geo-location, location via Wi-Fi® signal triangulation, location via detecting a NEC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1400 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX) Long Term Evolution (LTE) standard, others defined by various standard setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor and executable instructions accessible on a computer-readable medium that, when executed, cause the processor to perform operations comprising:
accessing image data indicating an image defined by multiple image pixels having respective visual characteristics;
segmenting the image into multiple superpixels, each superpixel corresponding to a respective group of contiguous image pixels;
automatically constructing a graph comprising:
a set of nodes corresponding to respective superpixels, a multiplicity of boundary nodes forming a subset of the set of nodes, each boundary node corresponding to a respective superpixel located at an image boundary;
a set of edges, each of which directly connects a corresponding pair of nodes, each non-boundary node in the set of nodes being connected to each boundary node by a respective edge forming part of the graph;
constructing a saliency map for the image based at least in part on the graph; and
identifying a shape and location of a foreground feature in the image based at least in part on the saliency map.

2. The system of claim 1, wherein the operations further comprise:
generating a weighted graph based on the graph and based on calculating a weighting value for each edge based at least in part on visual attributes of those superpixels corresponding to the associated pair of nodes connected by the edge, wherein the constructing of the saliency map is based at least in part on the weighted graph.

3. The system of claim 2, wherein the operations further comprise:
calculating the respective weighting value for each of the edges connecting non-boundary nodes to all of the boundary nodes by a procedure comprising:
calculating an initial weighting value for the edge; and
dividing the initial weighting value by the number of boundary nodes forming part of the graph.

4. The system of claim 2, wherein the calculating of the weighting values includes, for each edge that connects a respective pair of neighbor nodes, calculating a distance value that quantifies a difference between visual attributes of the superpixels corresponding to the respective neighbor nodes.

5. The system of claim 4, wherein the calculating of the weighting values comprises, for at least some of the edges, determining a shortest path that extends between the relevant pair of nodes and that comprises a sequence of one-hop edges connecting respective neighbor nodes, a path length being expressed based on a cumulative value for weighting values or distance values of the one-hop edges forming part of the relevant path.

6. The system of claim 5, wherein the generating of the weighted graph comprises:
for each edge connecting a pair of neighbor nodes, applying a respective weighting value based on the corresponding distance value; and
for each edge connecting a pair of non-neighbor nodes, applying a respective weighting value based on the corresponding shortest path.

7. The system of claim 2, wherein the calculating of the weighting value for each edge comprises:
for each node, determining a respective feature descriptor based at least in part on a plurality of visual attributes of the corresponding superpixel; and
for each edge, calculating the corresponding weighting value based at least in part on the respective feature descriptors of the pair of nodes connected by the end.

8. The system of claim 7, wherein the plurality of visual attributes upon which the feature descriptors are based comprises:
one or more color metrics; and
a texture metric.

9. The system of claim 1, wherein the operations further comprise extracting the foreground feature by applying the saliency map to the image.

10. A method comprising:
accessing image data indicating an image defined by multiple image pixels having respective visual characteristics;
segmenting the image into multiple superpixels, each superpixel corresponding to a respective group of contiguous image pixels;
in an automated operation performed using a graph constructor comprising circuitry configured to perform the automated operation, constructing a graph comprising:
a set of nodes corresponding to respective superpixels, a multiplicity of boundary nodes forming a subset of the set of nodes, each boundary node corresponding to a respective superpixel located at an image boundary;
a set of edges, each edge directly connecting a corresponding pair of nodes, each non-boundary node in the set of nodes being connected to each boundary node in the boundary node subset by a respective edge forming part of the graph;
in an automated procedure based at least in part on the graph and performed using a saliency map generator comprising circuitry configured to perform the automated procedure, constructing a saliency map for the image; and
identifying a shape and location of a foreground feature in the image based at least in part on the saliency map.

11. The method of claim 10, further comprising generating a weighted graph based on the graph and based on calculating a weighting value for each edge based at least in part on visual attributes of those superpixels corresponding to the associated pair of nodes connected by the edge, wherein the constructing of the saliency map is based at least in part on the weighted graph.

12. The method of claim 11, wherein the calculating of the weighting values comprises, for each edge that connects a respective pair of neighbor nodes, calculating a distance value that quantifies a difference between visual attributes of the superpixels corresponding to the respective neighbor nodes.

13. The method of claim 12, wherein the calculating of the weighting values comprises, for at least some of the edges, determining a shortest path that extends between the relevant pair of nodes and that comprises a sequence of one-hop edges connecting respective neighbor nodes, a path length being expressed based on a cumulative value for weighting values or distance values of the one-hop edges forming part of the relevant path.

14. The method of claim 13, wherein the generating of the weighted graph comprises:
for each edge connecting a pair of neighbor nodes, applying a respective weighting value based on the corresponding distance value; and
for each edge connecting a pair of non-neighbor nodes, applying a respective weighting value based on the corresponding shortest path.

15. The method of claim 11, wherein the calculating of the weighting value for each edge comprises:
for each node, determining a respective feature descriptor based at least in part on a plurality of visual attributes of the corresponding superpixel; and
for each edge, calculating the corresponding weighting value based at least in part on the respective feature descriptors of the pair of nodes connected by the end.

16. The method of claim 15, wherein the plurality of visual attributes upon which the feature descriptors are based comprises:
one or more color metrics; and
a texture metric.

17. The method of claim 16, wherein the plurality of visual attributes is limited to the one or more color metrics and the texture metric.

18. The method of claim 16, wherein the one or more color metrics includes:
a mean color value for the image pixels of the corresponding superpixel; and
a color space histogram for the corresponding superpixel.

19. The method of claim 10, further comprising extracting the foreground feature by applying the saliency map to the image.

20. A non-transitory computer readable storage medium having stored thereon instructions to cause a machine, when executing the instructions, to perform operations comprising:
accessing image data indicating an image defined by multiple image pixels having respective visual characteristics;
segmenting the image into multiple superpixels, each superpixel corresponding to a respective group of contiguous image pixels;
constructing a graph comprising:
a set of nodes corresponding to respective superpixels, a multiplicity of boundary nodes forming a subset of the set of nodes, each boundary node corresponding to a respective superpixel located at an image boundary;
a set of edges, each edge directly connecting a corresponding pair of nodes, each non-boundary node in the set of nodes being connected to each boundary node in the boundary node subset by a respective edge forming part of the graph;
constructing a saliency map for the image; and
identifying a shape and location of a foreground feature in the image based at least in part on the saliency map.

* * * * *